US005559389A

United States Patent [19]
Spindt et al.

[11] Patent Number: 5,559,389
[45] Date of Patent: Sep. 24, 1996

[54] ELECTRON-EMITTING DEVICES HAVING VARIOUSLY CONSTITUTED ELECTRON-EMISSIVE ELEMENTS, INCLUDING CONES OR PEDESTALS

[75] Inventors: Christopher J. Spindt, Menlo Park; John M. Macaulay, Palo Alto, both of Calif.

[73] Assignee: Silicon Video Corporation, San Jose, Calif.

[21] Appl. No.: 158,102

[22] Filed: Nov. 24, 1993

Related U.S. Application Data

[63] Continuation-in-part of Ser. No. 118,490, Sep. 8, 1993, Pat. No. 5,462,467.

[51] Int. Cl.$^6$ ............................................. H01J 1/30
[52] U.S. Cl. ...................... 313/310; 313/311; 313/336; 313/351; 313/355
[58] Field of Search ........................ 313/310, 311, 313/336, 351, 355, 631; 315/169.4; 345/47, 37, 41, 60, 75

[56] References Cited

U.S. PATENT DOCUMENTS

| | | | |
|---|---|---|---|
| 3,303,085 | 2/1967 | Price et al. ........................... | 428/131 |
| 3,407,125 | 10/1968 | Fehlner ................................. | 205/103 |
| 3,497,929 | 3/1970 | Shoulders ............................. | 29/25.17 |
| 3,562,881 | 2/1971 | Barrington et al. .................. | 445/52 |
| 3,665,241 | 5/1972 | Spindt .................................. | 313/309 X |
| 3,775,704 | 8/1973 | Spindt et al. ........................ | 313/351 X |
| 4,008,412 | 2/1977 | Yuito et al. .......................... | 313/309 |
| 4,338,164 | 7/1982 | Spohr .................................. | 204/4 |
| 4,345,181 | 8/1982 | Shelton ............................... | 313/309 |
| 4,668,957 | 5/1987 | Spohr .................................. | 343/812 |
| 4,732,646 | 3/1988 | Elsner et al. ........................ | 156/626 |
| 4,874,981 | 10/1989 | Spindt ................................. | 313/309 |
| 4,940,916 | 7/1990 | Borel et al. ......................... | 313/309 X |
| 5,053,673 | 10/1991 | Tomii et al. ......................... | 313/309 X |
| 5,142,184 | 8/1992 | Kane ................................... | 313/336 X |
| 5,150,019 | 9/1992 | Thomas et al. ...................... | 313/310 |
| 5,150,192 | 9/1992 | Green et al. ......................... | 313/309 X |
| 5,164,632 | 11/1992 | Yoshida ............................... | 313/309 |
| 5,170,092 | 12/1992 | Tomii et al. ......................... | 313/310 |
| 5,194,780 | 3/1993 | Meyer ................................. | 313/309 X |
| 5,199,917 | 4/1993 | MacDonald et al. ................ | 313/336 X |
| 5,211,707 | 5/1993 | Ditchek et al. ..................... | 445/24 |

FOREIGN PATENT DOCUMENTS

| | | | |
|---|---|---|---|
| 351110A1 | 1/1990 | European Pat. Off. ........... | H01J 9/02 |
| 416625A2 | 3/1991 | European Pat. Off. ........... | H01J 1/30 |
| 2951287A1 | 7/1981 | Germany ........................... | H01J 1/30 |
| 4209301C1 | 8/1993 | Germany ........................... | H01J 29/50 |
| WO92/02030 | 2/1992 | WIPO ................................ | H01J 1/30 |
| WO93/18536 | 9/1993 | WIPO ................................ | 313/311 |

OTHER PUBLICATIONS

Possin, "A Method for Forming Very Small Diameter Wires," *Rev. Sci. Instrum.*, vol. 41, 1970, pp. 772–774.

Williams et al, "Fabrication of 80 Å metal wires," *Rev. Sci. Instrum.*, Mar. 1984, pp. 410–412.

Shiraki et al, "Perpendicular Magnetic Media by Anodic Oxidation Method and Their Recording Characteristics," *IEEE Trans. Mags.*, Sep. 1985, pp. 1465–1467.

Tsuya et al, "Alumite Disc Using Anordic [sic] Oxidation," *IEEE Trans. Mags.*, Sep. 1986, pp. 1140–1145.

(List continued on next page.)

Primary Examiner—Walter E. Snow
Assistant Examiner—Ashok Patel
Attorney, Agent, or Firm—Skjerven, Morrill, MacPherson, Franklin & Friel; Ronald J. Meetin

[57] ABSTRACT

A gated electron-emitting device contains a multiplicity of electron-emissive elements, each formed with a pedestal (98) and an overlying cone ($94_1$). In each electron-emissive element, the base diameter of the cone is greater than the element, the base diameter of the cone is greater than the diameter of the pedestal. With the pedestal being electrically conductive, the cone may be electrically resistive. Alternatively, each electron-emissive element can be an elongated element (30B) that reaches a maximum diameter at a point between, and spaced apart from, both ends of the element.

32 Claims, 14 Drawing Sheets

OTHER PUBLICATIONS

Arai et al, "Magnetic Properties of Iron Electro–Deposited Alumite Films," *IEEE Trans. Mags.*, Sep. 1987, pp. 2245–2247.

Cochran et al, "Low–voltage field emission from tungsten fiber arrays in a stabilized zirconia matrix," *J. Mater. Res.*, May/Jun. 1987, pp. 322–328.

Penner et al, "Preparation and Electrochemical Characterization of Ultramicroelectrode Ensembles," *Anal. Chem.*, 1 Nov. 1987, pp. 2625–2630.

Chakarvarti et al, "Morphology of etched pores and microstructures fabricated from nuclear track filters," *Nucl. Instr. & Meth. Phys. Res.*, vol. B62, 1991, pp. 209–115.

Kirkpatrick et al, "Vacuum field emission from a $SiTaSi_2$ semiconductor–metal eutectic composite," *Appl. Phys., Lett.*, Oct. 1991, pp. 2094–2096.

Hill et al, "A Low Voltage Field Emitter Array Cathode for High Frequency Applications," Abstract 6.5, 5th Int'l Vac. Microelec. Conf., 13–17 Jul. 1992, 2 pp.

Sune et al, "Fabrication of Silicon–Column–Field Emitters for Microwave Applications," *Tech. Dig., 6th Int'l. Vac. Microelec. Conf.*, 12–15 Jul. 1993, pp. 15–16.

Chakarvarti et al, "Microfabrication of metal–semiconductor heterostructures and tubules using nuclear track filters," *Micromech. Microeng.*, vol. 3, 1993, pp. 57–59.

Spohr, *Ion Tracks and Microtechnology, Principles and Applications* (Viewig), edited by K. Bethge, 1990, pp. 246–255.

T. Utsumi, "Keynote Address, Vacuum Microelectronics: What's New and Exciting," *IEEE Tans. Elec. Dev.*, Oct. 1990, pp. 2276–2283.

H. Busta, "Vacuum Microelectronics–1992," *J. Micromech. Microeng.*, vol. 2, 1992, pp. 43–74.

B. Fischer et al. "Production and Use of Nuclear Tracks: imprinting structure on solids," *Rev. Mod. Phys.*, Oct. 1983, pp. 908–948.

K. Betsui, "Fabrication and Characteristics of Si Field Emitter Arrays," *Tech. Dig. of IVMC 91*, 1991, pp. 26–29.

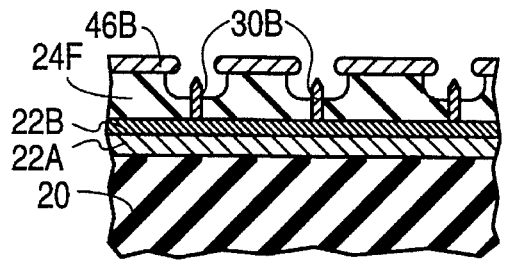
FIG. 13.1
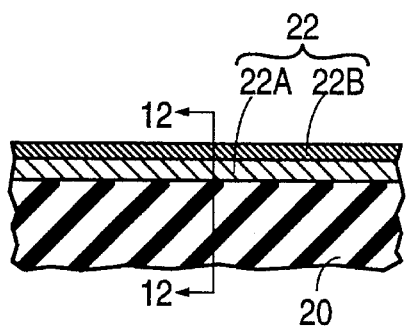
FIG. 11
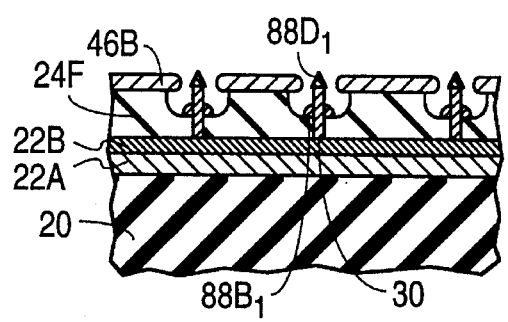
FIG. 13.2
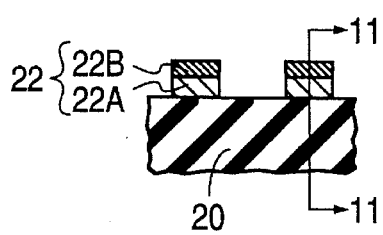
FIG. 12
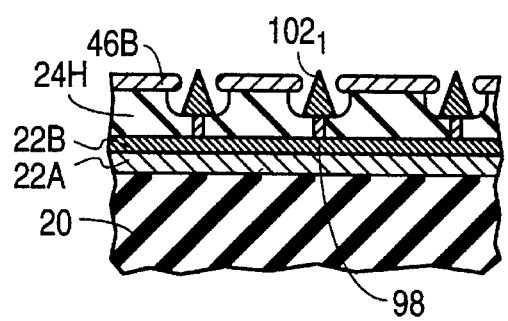
FIG. 13.3
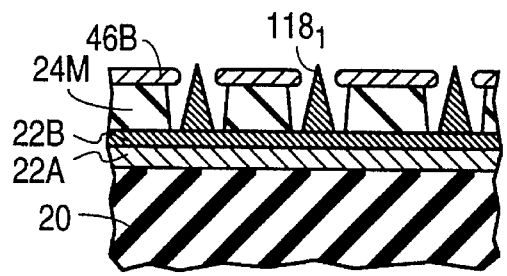
FIG. 13.4

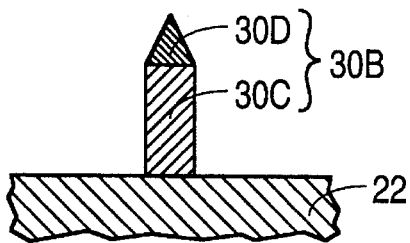
FIG. 17.1
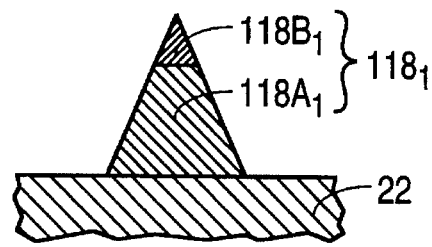
FIG. 17.2
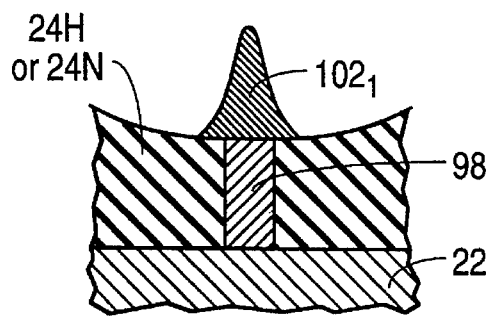
FIG. 18.1
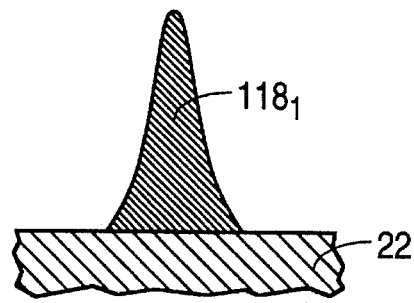
FIG. 18.2

FIG. 19.1  FIG. 19.2  FIG. 19.3  FIG. 19.4
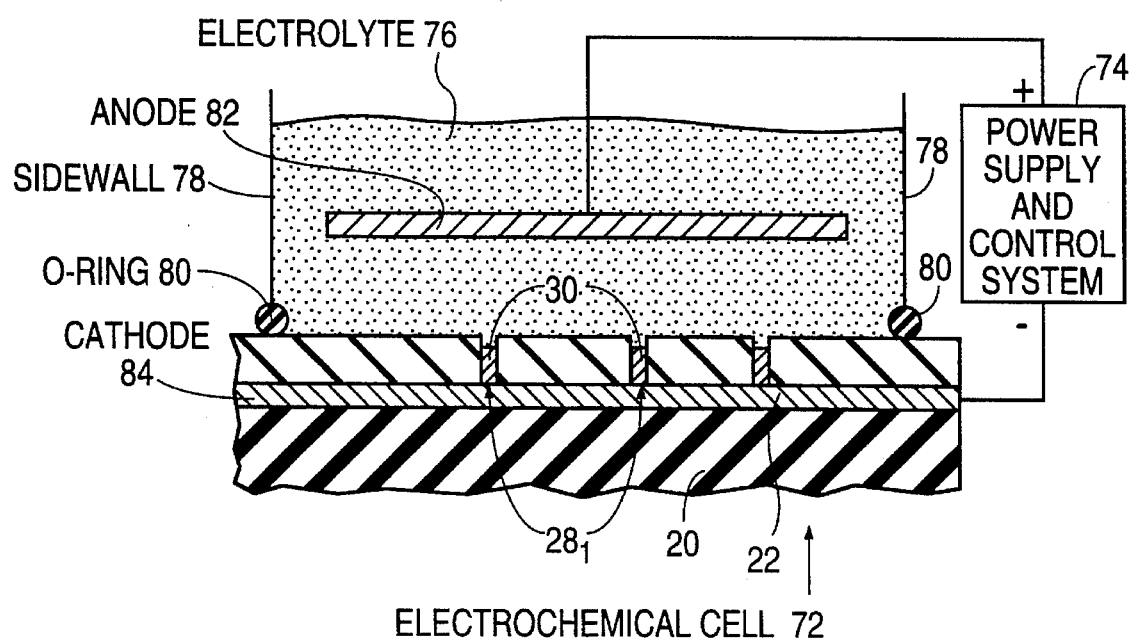
FIG. 20

ELECTRON-EMITTING DEVICES HAVING VARIOUSLY CONSTITUTED ELECTRON-EMISSIVE ELEMENTS, INCLUDING CONES OR PEDESTALS

CROSS-REFERENCE TO RELATED APPLICATION

This is a continuation-in-part of U.S. patent application Ser. No. 08/118,490, filed 8 Sep. 1993, now U.S. Pat. No. 5,462,467.

FIELD OF USE

This invention relates to electron-emitting devices. More particularly, this invention relates to structures and manufacturing techniques for field-emission devices (or field emitters) suitable for products such as cathode-ray tubes of the flat-panel type.

BACKGROUND ART

A field-emission cathode is an electronic device that emits electrons when subjected to an electric field of sufficient strength. The electric field is created by applying a voltage between the cathode and an electrode, typically referred to as the anode or gate electrode, situated a short distance away from the cathode.

A field emitter typically contains a group, often a very large group, of individual electron-emissive elements distributed across a supporting structure. This configuration is commonly referred to as an area field emitter. A variety of different shapes have been investigated for the electron-emissive elements in area field emitters.

Spindt et al, U.S. Pat. No. 3,665,241, discloses an area field-emission structure in which the electron-emissive elements consist of solid cones or pyramids situated in an ordered array over a flat substrate electrode. Each cone or pyramid lies directly on the substrate electrode, or is situated on a pedestal that lies on the substrate. The field emitter can include a top electrode spaced apart from the substrate and having a like-ordered array of openings through which the electron-emissive elements are exposed.

In fabricating the electron-emissive elements in Spindt et al, a screen having an appropriate array of circular or square openings is placed above the substrate electrode. A deposition is then performed simultaneously from two sources. One of the sources consists of an emitter-forming metal, such as molybdenum, atoms of which are deposited in a direction perpendicular to the substrate electrode. The other source consists of a closure material, such as a molybdenum-alumina composite. Atoms of the closure material are caused to impinge on the screen at a small angle to the substrate. The closure material progressively closes the openings in the screen as the emitter-forming metal passes through the openings to create the electron-emissive elements. The result is that the emitter-forming metal is deposited in the shape of cones or pyramids depending on whether the screen openings are circular or square.

Yoshida et al, U.S. Pat. No. 5,164,632, discloses a gated field-emission structure in which solid elongated gold electron-emissive elements are situated in pores extending through an alumina layer. An address line lying under the alumina layer contacts the lower ends of the electron-emissive elements. Their upper ends are pointed. A gate electrode situated above the electron-emissive elements extends slightly into the pores.

To manufacture their field emitter, Yoshida et al anodically oxidize part of an aluminum plate to create a thin alumina layer having pores that extend nearly all the way through the alumina. An electrolytic technique is used to fill the pores with gold for the electron-emissive elements. The address line is formed over the filled pores along the alumina side of the structure after which the remaining aluminum and part of the adjoining alumina are removed along the opposite side of the structure to re-expose the gold in the pores. Part of the re-exposed gold is removed during an ion-milling process utilized to sharpen the electron-emissive elements. Gold is then evaporatively deposited onto the alumina and partly into the pores to form the gate electrode.

Greene et al, U.S. Pat. No. 5,150,192, discloses a gated field emitter in which hollow elongated electron-emissive elements extend through a thin electrically insulating substrate. The electron-emissive elements have pointed tips that protrude into cavities provided along the upper substrate surface below the gate electrode. A metal film lies along the lower substrate surface.

In fabricating their field emitter, Greene et al create openings partway through the substrate by etching through a mask formed on the bottom of the substrate. Metal is deposited along the walls of the openings and along the lower substrate surface. A portion of the thickness of the substrate is removed along the upper surface. The gate electrode is then formed by a deposition/planarization procedure. The cavities are provided along the upper substrate surface after which the hollow metal portions in the openings are sharpened to complete the electron-emissive elements.

A large-area field emitter for an application such as a flat-panel television screen where the diagonal screen dimension is 25 cm needs a relatively strong substrate for supporting the field-emission components extending across the large emitter area. The requisite substrate thickness is typically several hundred microns to 10 mm or more. Due to the ways in which Yoshida et al and Greene et al manufacture their field emitters, it would be quite difficult to attach those emitters to substrates of such thickness. Consequently, Yoshida et al and Greene et al are not suited for scaling up to large-area field-emission applications.

Borel et al, U.S. Pat. No. 4,940,916, discloses a gated area field emitter in which the electron-emissive elements consist of cones formed on a highly resistive layer that overlies a highly conductive layer situated on an electrically insulating supporting structure. For a thickness of 0.1–1 micron, the highly resistive layer has a resistivity of $10^4$–$10^5$ ohm-cm. The resistive layer limits the currents through the electron-emissive cones so as to protect the field emitter from breakdown and short circuits.

Busta, "Vacuum Microelectronics—1992," *J. Micromech. Microeng.*, Vol. 2, 1992, pp. 43–74, provides a general review of field-emission devices. Among other things, Busta discusses Utsumi, "Keynote Address, Vacuum Microelectronics: What's New and Exciting," *IEEE Trans. Elect. Dev.*, Oct. 1990, pp. 2276–2283, who suggests that a filament with a rounded end is the best shape for a field-emission element. Busta also discusses Betsui, "Fabrication and Characteristics of Si Field Emitter Arrays," *Tech. Dig. IVMC* 91, 1991 pp. 26–29, who utilizes a lift-off technique in forming a field-emitter array. Also of interest is Fischer et al, "Production and use of nuclear tracks: imprinting structure on solids," *Rev. Mod. Phys.*, Oct. 1983, pp. 907–948, which deals with the use of charged-particle tracks in manufacturing field emitters according to a replica technique.

GENERAL DISCLOSURE OF THE INVENTION

The present invention furnishes a simple, accurate, and easily controllable process for manufacturing an efficient, reliable gated area field-emission structure. The invention uses charged-particle tracks in providing the field-emitter with small electron-emissive elements self-aligned to the gate electrode. Each electron-emissive element can be formed as a pedestal having a pointed tip, as a cone, or as a combination of a pedestal and an overlying cone whose base diameter is greater than the diameter of the pedestal.

More specifically, in accordance with the invention, a structure is initially created in which an electrically insulating layer lies over a lower electrically conductive region, an electrically conductive gate layer lies over the insulating layer, and a further layer lies over the gate layer. A multiplicity of charged-particle tracks are formed through the further layer by appropriately subjecting the structure to charged particles. The further layer is etched along the charged-particle tracks to create corresponding apertures through the further layer. The gate layer is etched through the apertures in the further layer to form corresponding gate openings through the gate layer.

Next, an insulating layer is etched through the gate openings to create corresponding dielectric open spaces through the insulating layer. Preferably, this etching step is done along charged-particle tracks which are formed through the insulating layer when the structure is subjected to the charged particles and which are respectively in line with the charged-particle tracks through the further layer. A like multiplicity of electron-emissive elements are then formed over the lower conductive region in such a way that each electron-emissive element contacts the lower conductive region through a corresponding one of the dielectric open spaces.

Each electron-emissive element is normally centered in its dielectric open space. This is typically accomplished by creating the electron-emissive elements in such a manner that they laterally adjoin the insulating layer along the dielectric open spaces or by depositing electrically conductive material into the dielectric open spaces in a centered manner to form the electron-emissive elements even though the deposited material does not laterally adjoin the insulating layer. In creating the dielectric open spaces, the gate layer is normally used as an etch mask so that each dielectric open space is centered on the corresponding gate opening. Consequently, the electron-emissive elements are self-aligned to the gate openings.

In one embodiment of the present field emitter where the lower conductive region consists of metal, each electron-emissive element contains a highly resistive portion and an overlying electron-emissive portion. For example, when each electron-emissive element is formed as a cone situated on a pedestal, part or all of the pedestal typically constitutes the highly resistive portion. The highly resistive portions act as current limiters for preventing failure due to arcing or short circuits. The highly resistive portions also improve the emission uniformity.

The invention has many advantages. For example, by using charged-particle tracks to achieve self-alignment, the electron-emissive elements and gate openings can be made quite small without regard to conventional lithographic patterning tolerances. In particular, the components of the field-emission structure can be manufactured at lateral dimensions on the nanometer scale. Because use of charged-particle tracks provides essentially infinite depth of focus, it is not necessary that the patterned surfaces be extremely flat.

The fabrication process of the invention is simple and highly accurate. In addition the process is inexpensive and well-suited for scaling up to manufacturing large-area field emitters for cathode-ray tubes in flat-panel televisions. In short, the invention provides a substantial advance over the prior art.

BRIEF DESCRIPTION OF THE DRAWINGS

FIG. 11 is a cross-sectional front structural view depicting how the initial structure of FIG. 1a appears when the lower conductive region consists of a highly conductive part and a highly resistive part.

FIG. 12 is a cross-sectional side structural view corresponding to FIG. 11. The cross section of FIG. 11 is taken through plane 11—11 in FIG. 12. The cross section of FIG. 12 is taken through plane 12—12 in FIG. 11.

FIGS. 13.1, 13.2, 13.3, and 13.4 are cross-sectional front structural views respectively depicting how the final structures of FIGS. 1j, 3e, 7h, and 9e appear when they contain the two-part lower conductive region of FIG. 11.

FIGS. 17.1 and 17.2 are expanded cross-sectional front views of alternative electron-emissive elements employable in the present field emitters where each electron-emissive element consists of a highly resistive portion and an overlying electron-emissive portion.

FIGS. 18.1 and 18.2 are expanded cross-sectional front views of alternative shapes for electron-emissive cones in the present field emitters.

FIGS. 19.1, 19.2, 19.3 and 19.4 are cross-sectional longitudinal views of differently shaped electron-emissive filaments usable in the field-emission structures of FIGS. 1j and 14l.

FIG. 20 is a functional diagram for the components of an electrochemical deposition system used in the invention.

Like reference symbols are employed in the drawings and in the description of the preferred embodiments to represent the same, or very similar, item or items.

DESCRIPTION OF THE PREFERRED EMBODIMENTS

Figure 1A:
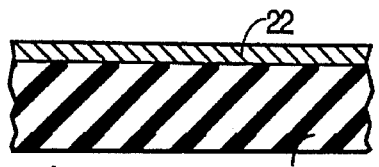
FIGS. 1a, 1b, 1c, 1d, 1e, 1f, 1g, 1h, 1i, and 1j are cross-sectional front views representing steps in manufacturing a gated field emitter according to the invention.

The present invention makes use of electrochemical deposition in which a material, usually a metal, is deposited from an (ionized) electrolyte in a (liquid) solvent. Electrochemical deposition is typically performed by passing current between a pair of electrodes to enable the material to accumulate on one of the electrodes. Nonetheless, electrochemical deposition can be performed in an electroless manner at zero applied potential.

Referring to the drawings, FIGS. 1a–1j (collectively "FIG. 1") and FIGS. 2a–2j (collectively "FIG. 2") illustrate a process for manufacturing a gated area field-emission cathode structure according to the teachings of the invention. The field-emission structure is typically used to excite phosphors on a face plate in a cathode-ray tube of a flat-panel television screen.

The starting point for the fabrication process is an electrically insulating substrate 20 typically consisting of ceramic or glass. Substrate 20 is typically configured as a plate having a largely flat upper surface and a largely flat lower surface substantially parallel to the upper surface.

Substrate 20 furnishes support for the field-emission structure. As such, the substrate thickness is at least 500 microns. In a 25-cm (diagonal) flat-panel television screen where substrate 20 provides substantially the sole support for the field emitter, the substrate thickness is typically 4–14 mm. If support struts are placed between the phosphor-coated face plate and the field emitter, the substrate thickness is typically 1–2 mm.

Figure 2A:
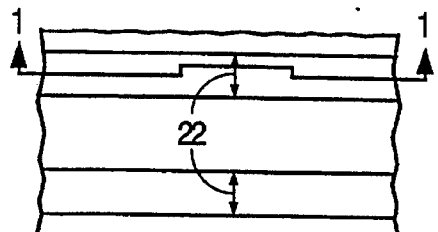
FIGS. 2a, 2b, 2c, 2d, 2e, 2f, 2g, 2h, 2i, and 2j are plan views respectively corresponding to FIGS. 1a–1j. The cross sections of FIGS. 1a–1j are taken through stepped plane 1—1 in FIGS. 2a–2j.

A lower electrically conductive region 22 is formed along the top of substrate 20 as indicated in FIGS. 1a and 2a. Lower conductive region 22 consists of a metal such as chromium. In this case, the thickness of region 22 is 0.05–1.5 micron. Other candidates for region 22 include tantalum, tungsten, and molybdenum.

Lower conductive region 22 is typically a patterned layer containing a group of parallel lines, of which two such lines are depicted in FIG. 2a. When region 22 is configured in this way, the final field-emission structure is particularly suitable for selectively exciting phosphors in a flat-panel television. These lines are typically 300 microns wide for the 25-cm monochrome flat-panel television example. Nonetheless, region 22 can be arranged in various other patterns, or can even be unpatterned.

A largely homogeneous electrically insulating layer 24 is formed on the top of the structure. See FIGS. 1b and 2b. Parts of insulating layer 24 are situated on both substrate 20 and lower conductive region 22. The thickness of layer 24 is 0.1–2.0 microns, typically 1.0 micron. Suitable materials for insulating layer 24 fall into three groups: (a) organic polymers such as polycarbonate, polystyrene, and cellulose acetate, (b) inorganic glasses such as phosphate, silicate, and soda-lime glasses, and (c) crystals such as mica and quartz.

Figure 1B:
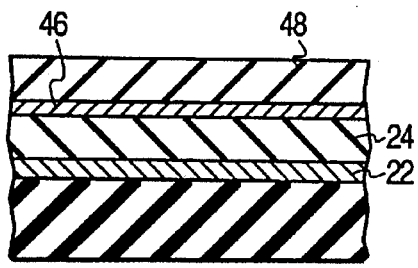
Figure 2B:
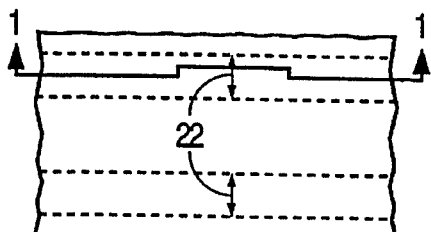

A blanket electrically conductive layer 46, which later becomes the gate electrode, is formed on top of insulating layer 24 as indicated in FIG. 1b. Conductive layer 46 is typically 0.05 micron in thickness. Layer 46 consists of a metal such as molybdenum, copper, or aluminum. The method for creating layer 46 is not particularly critical as long as its thickness is relatively uniform. Layer 46 is typically formed by a physical vapor deposition technique.

A further electrically insulating layer 48 is formed on top of conductive layer 46. Again see FIG. 1b. Insulating layer 48 is in the range of 0.2–0.5 micron in thickness. As with insulating layer 24, layer 48 consists of (a) an organic polymer such as polycarbonate, polystyrene, or cellulose acetate, (b) an inorganic glass such as phosphate, silicate, or soda-lime glass, or (c) a crystal such as mica or quartz. Although there are some implementations in which layer 48 consists of the same insulator as layer 24, layer 48 is normally formed with an insulator that is selectively etchable with respect to layer 24.

Figure 1C:
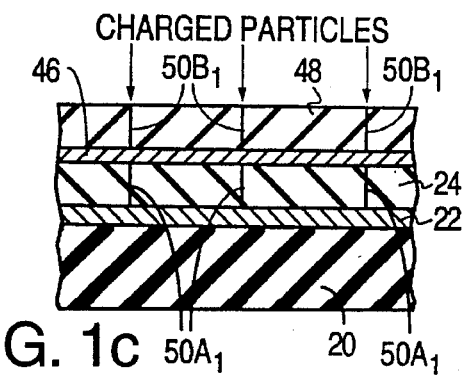
Figure 2C:
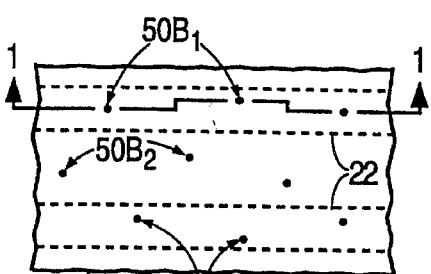

The structure is now subjected to energetic charged particles that impinge on top of insulating layer 48 in a direction largely perpendicular to the flat lower surface of substrate 20 and thus in a direction generally perpendicular to the upper structural surface. The charged particles have sufficient energy to pass through layers 48, 46, and 24 and into the underlying material to form straight tracks through insulating layers 24 and 48 at random locations across the structure. FIGS. 1c and 2c illustrate the track formation. The charged-particle tracks constitute damaged zones along the particle paths.

The charged-particle tracks are indicated by reference symbols beginning with "50" in FIGS. 1c and 2c. Each track is divided into (a) a "50A" segment extending through insulating layer 24 and (b) a "50B" segment extending through insulating layer 48 in a straight line with the 50A segment. Although the charged particles pass through metal layer 46, they do not significantly damage layer 46 and therefore do not create charged-particle tracks through layer 46. The tracks fall into two categories: (a) segments $50A_1$ and $50B_1$ (collectively "$50_1$") extending respectively through portions of layers 24 and 48 overlying lower conductive region 22 and (b) segments $50A_2$ and $50B_2$ (collectively "$50_2$") extending respectively through portions of layers 24 and 48 not overlying region 22.

Charged-particle tracks $50_1$ and $50_2$ (collectively "50") extend parallel to one another in a direction generally perpendicular to the upper structural surface. Although tracks 50 are randomly distributed across the field emitter, they have a well-defined average spacing. The track density can be as much as $10^{11}$ tracks/cm$^2$. A typical value is $10^8$ tracks/cm$^2$ which yields an average track spacing of approximately 1 micron. For illustrative purposes, only a small portion of tracks 50 are indicated in FIGS. 1c and 2c.

The charged particles penetrate into the material below insulator 24. Such penetration is not material here and, accordingly, is not shown in the drawings.

In a typical implementation, a charged-particle accelerator which forms a well-collimated beam of ions is employed to form tracks 50. The ion beam is scanned uniformly across insulating layer 48. The preferred charged-particle species is doubly ionized argon ($Ar^{++}$) at an energy of 8 MeV. Alternatively, tracks 50 could be created from a collimated source of nuclear fission particles produced, for example, by the radioactive element californium 252.

The damaged insulating material along track segments 50B in insulating layer 48 is removed by bringing layer 48 into contact with (e.g., by immersion) a suitable chemical etchant that attacks the damaged 50B track material much more than the undamaged material of layer 48. As a result, generally circular pores are etched through layer 48 along segments 50B down to metal layer 46. The etchant preferably does not significantly attack any of the other parts of the field-emission structure.

The etch is continued into the largely undamaged material of insulating layer 48 to broaden the pores. Apertures $52_1$ and $52_2$ are thereby respectively created along track segments $50B_1$ and $50B_2$. See FIGS. 1d and 2d. Apertures $52_1$ and $52_2$ (collectively "52") expose corresponding portions of the upper surface of metal layer 46. The etch is performed in a laterally uniform manner. Accordingly, each aperture 52 is centered on the location of corresponding track segment 50B. The thickness of layer 48 is also reduced during the etch.

The second part of the insulating-material etch can be done with the etchant used during the first part or with another etchant. In either case, components 20, 22, 24, and 46 are not significantly attacked during the second part of the etch. Apertures 52 reach an average diameter of 15–300 nm, typically 140 nm, along the bottom of the reduced-thickness remainder 48A of insulating layer 48. The aperture diameter is substantially the same for all of apertures 52.

Figure 1D:
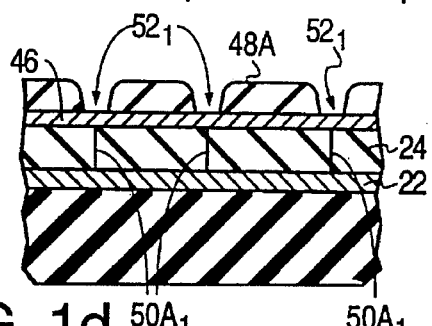
Figure 2D:
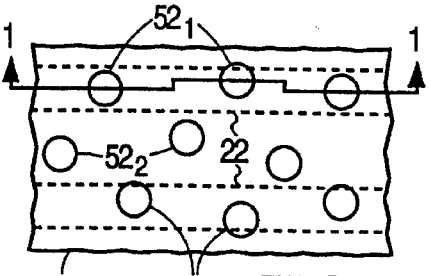

Apertures 52 are generally circular in shape as viewed from the top in the plan view of FIG. 2d. Apertures 52 are also usually somewhat wider at the top than at the bottom as indicated in FIG. 1d. The reason for sloping apertures 52 in this way is to facilitate subsequent etching of metal layer 46. The aperture slope is obtained by using etchant whose selectivity—i.e., ratio of the rate at which the damaged track material is attacked to the rate at which the undamaged insulating material is attacked—is relatively low—e.g., 10 or less.

Figure 1E:
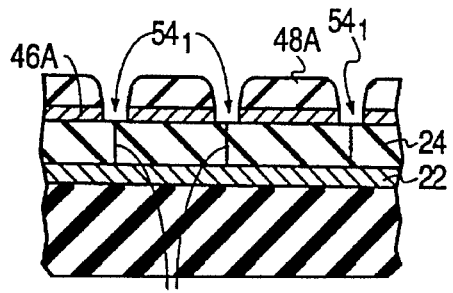
Figure 2E:
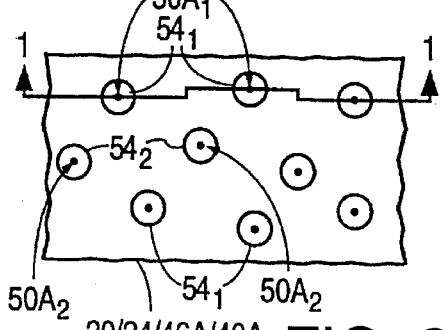

Using insulating layer 48A as an etch mask, the portions of metal layer 46 exposed through apertures 52 are removed with an anisotropic etchant to create generally circular gate openings through layer 46 down to insulating layer 24. FIGS. 1e and 2e depict the consequent structure in which openings $54_1$ extend through the portions of layer 46 located above lower conductive region 22, while openings $54_2$ extend through the portions of layer 46 not overlying region 22. The remainder 46A of layer 46 is the patterned gate electrode for the field emitter. The anisotropic etch is typically done according to a reactive-ion-etch technique.

The etchant utilized to create gate openings $54_1$ and $54_2$ (collectively "54") is controlled in such a way as to avoid significantly attacking other parts of the structure. Due to the anisotropic nature of the etch, each opening 54 is of largely the same transverse shape—i.e., generally circular—and of nearly the same diameter as corresponding aperture 52 (along the bottom of insulating layer 48A). Each opening 54 is vertically aligned with corresponding aperture 52. Since each aperture 52 is centered on the location of corresponding track segment 50B, each opening 54 is also centered on the location of corresponding segment 50B.

Insulating layer 48A is usually removed at some point subsequent to the creation of openings 54. As, for example, indicated in FIGS. 1f and 2f, layer 48A could be removed directly after openings 54 are formed.

With portions of the upper surface of insulating layer 24 now exposed at track segments 50A, the structure is brought into contact with a chemical etchant that attacks the damaged material along segments 50A much more than the undamaged material of layer 24. Pores $28_1$ and $28_2$ are thereby created through layer 24 respectively along track segments $50A_1$ and $50A_2$. See FIGS. 1g and 2g. For illustrative purposes, the lateral dimensions of pores $28_1$ and $28_2$ (collectively "28") compared to widths of the lines that form conductive layer 22 are greatly exaggerated in the plan-view drawings. The remainder of layer 24 now constitutes homogeneous porous insulating layer 24A.

Figure 2G:
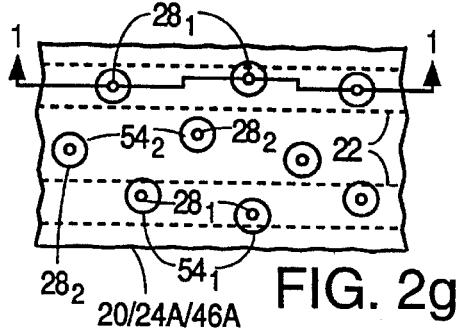

Pores 28 are generally circular in shape as viewed from the top in the plan view of FIG. 2g. Depending on how the track etching is done, pores 28 can be cylindrical or (slightly) conical in three dimensions. For purposes of illustration, pores 28 are represented as cylinders in the drawings. The pore diameter can vary from 4 nm to 2 microns. Preferably, the pore diameter lies in the range of 10–200 nm.

The etchant used for creating pores 28 preferably does not significantly attack substrate 20 or conductive region 22. When components 20, 22, and 24A respectively consist of ceramic, chromium, and polycarbonate, the etching is done in 6.25 normal sodium hydroxide. The etch time is 2–3 minutes for a typical 0.5-micron porous-layer thickness.

Figure 1F:
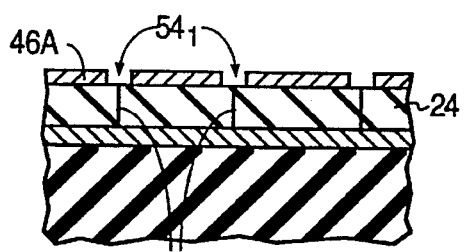
Figure 2F:
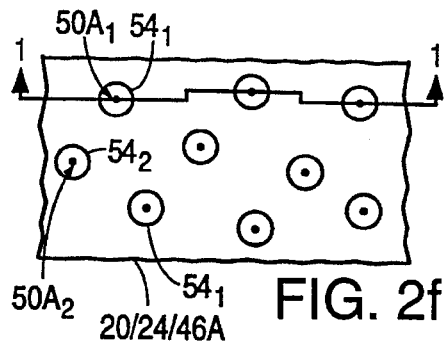
Figure 1G:
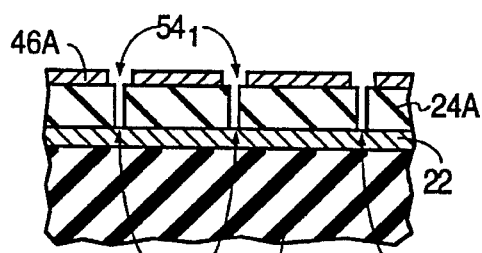

Importantly, each pore 28 in FIGS. 1g and 2g is considerably narrower than corresponding opening 54. For example, when the bottom diameter of one of apertures 52 is 140 nm so that corresponding gate opening 54 is 150 nm in diameter, corresponding pore 28 typically has a diameter of 50 nm. Each pore 28 is centered on the location of corresponding track segment 50A. Because (a) each track segment 50B was in a straight line with corresponding track segment 50A and (b) each opening 54 is centered on the location of corresponding track segment 50B, each opening 54 is centered on corresponding pore 28.

Figure 1H:
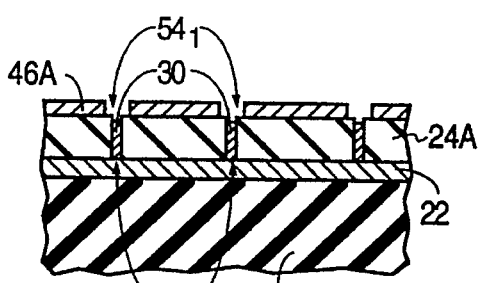
Figure 2H:
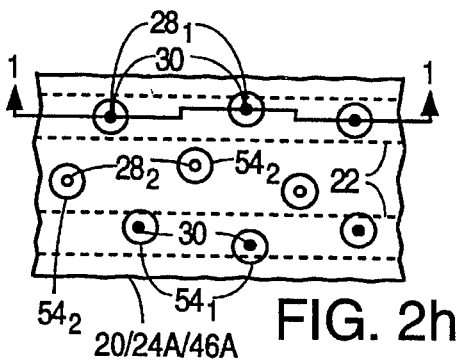

A suitable filament metal is now electrochemically deposited to form electron-emissive metal filaments 30 in pores $28_1$ overlying lower conductive region 22 as indicated in FIGS. 1h and 2h. The deposition is performed in an electrochemical cell, described below, in which conductive region 22 acts as a deposition cathode. After bringing the structure into contact with the cell electrolyte and activating the cell, current flows between cathode 22 and a separate anode. The filament metal uniformly builds up in pores $28_1$ starting from conductive region 22. The lower ends of filaments 30 contact region 22.

Substantially none of the filament metal accumulates in pores $28_2$ directly above substrate 20 because there is no electrical contact at the bottoms of pores $28_2$. In FIG. 2h, the dark circles represent filaments 30 in filled pores $28_1$, while the light circles represent empty pores $28_2$. The use of conductive layer 22 as the cathode during the electrochemical deposition enables the deposition to be selective.

The electrochemical deposition is typically performed for a time sufficient to enable the upper ends of pores 30 to be nearly coplanar with top of porous layer 24A. This situation is illustrated in FIG. 1h. The deposition can, however, be performed for a longer time so that filaments 30 bulge slightly out of pores $28_1$ or for a shorter time so that the upper ends of filaments 30 are significantly below the top of layer 24A.

The upper ends of filaments 30 are preferably formed with a noble metal. In a typical implementation, the upper ends of filaments 30 consist of platinum when conductive region 22 is chromium. Other candidate noble metals for the upper filament ends are gold and palladium. The remaining portions of filaments 30 typically consist of the same (noble) metal as the upper ends but can be formed with another metal such as nickel, copper, cobalt, molybdenum, or niobium.

Elements 30 are true filaments for which the ratio of length to maximum diameter is at least 2 and normally at least 3. The length-to-maximum-diameter ratio is preferably 10 or more. Filaments 30 are typically cylinders of circular transverse cross section. Nonetheless, the transverse cross section can be somewhat non-circular. In any case, the ratio of maximum diameter to minimum diameter for each filament 30 is usually no more than 2.

Filaments 30 are all of substantially the same length. The filament length is 0.1–2.0 microns, typically 1.0 micron. Inasmuch as pores $28_1$ are situated at random locations across porous layer 24, filaments 30 are likewise situated at random places above conductive region 22. Due to the centering that results from the track formation and etching, filaments 30 are self-aligned to openings $54_1$ and therefore to gate electrode 46A.

The cathode/gate structure of FIGS. 1h and 2h can be directly utilized as a field emitter. Nonetheless, it is advantageous for filaments 30 to extend out of the porous material. It is also desirable for filaments 30 to have sharpened upper ends.

Figure 1I:
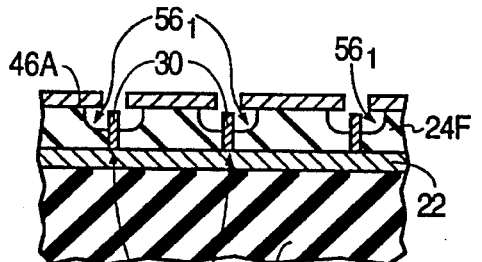
Figure 2I:
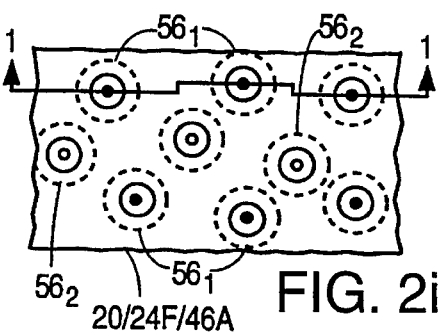

To this end, portions of porous layer 24A exposed through openings $54_1$ are removed with an isotropic etchant to form cavities $56_1$ around filaments 50 as indicated in FIGS. 1i and 2i. Because gate layer 46A also has openings $54_2$, portions of layer 24A exposed through openings $54_2$ are simultaneously removed to form cavities $56_2$. Cavities $56_1$ and $56_2$ (collectively "56") can extend partway, or all the way, down to lower conductive region 22. FIG. 1i indicates the former case. In either case, filaments 30 now protrude outward beyond the remainder 24F of porous layer 24A. Items $28A_1$ and $28A_2$ (collectively "28A") in FIGS. 1i and 2i indicate the respective remainders of pores $28_1$ and $28_2$.

Each cavity 56 is considerably wider—i.e., has a considerably greater maximum transverse cross-sectional area—than corresponding pore 48A. Also, each cavity 56 is normally somewhat wider than corresponding gate opening 54. Consequently, cavities 56 extend slightly under gate electrode 46A.

An electropolishing and etching operation is performed on filaments 30 to tailor and sharpen their upper ends. The electropolishing, which is done first, rounds the upper ends of filaments 30 and reduces their length somewhat. The etch sharpens the rounded filament ends.

The electropolishing is performed in an electrolytic cell in which filaments 30 constitute the anode. After bringing the structure of FIGS. 1i and 2i into contact with the cell electrolyte, a suitable potential is applied between (a) filaments 30 by way of lower conductive region 22 and (b) a separate cathode plate to cause current to flow between filaments 30 and the cathode plate. The electropolishing is typically conducted in an operational regime where the rate of metal removal increases with increasing electric field strength. Because the highest electric field, and thus the greatest material removal rate, for each filament 30 occurs at the outer top filament edge, the upper ends of filaments 30 become rounded.

By arranging the lower surface of substrate 20 to be approximately parallel to the cathode plate in the electrolytic cell, the upper ends of the longer ones of filaments 30 experience the highest electric fields. More material is thereby removed from the upper ends of the longer ones of filaments 30 than from the shorter ones during the electropolishing. Accordingly, the electropolishing also enables filaments 30 to become more uniform in length.

The filament etch is also typically done by bringing the field-emission structure into contact with the electrolyte of an electrolytic cell in which filaments 30 constitute the anode to which a driving voltage is applied via lower conductive region 22. The rate of metal removal varies with electric field strength and filament morphology in such a way that the rounded upper ends of filaments 30 become pointed. The etch can also be performed according to a chemical technique. If done chemically (rather than electrochemically), undesired etching of gate layer 46A can be avoided by applying an appropriate voltage to layer 46A and/or making suitable materials selection.

An electropolishing step is also typically performed to round the edges of patterned gate layer 46A overlying cavities 56. Layer 46A acts as the anode during this step, while filaments 30 serve as the cathode via lower conductive region 22.

Figure 1J:
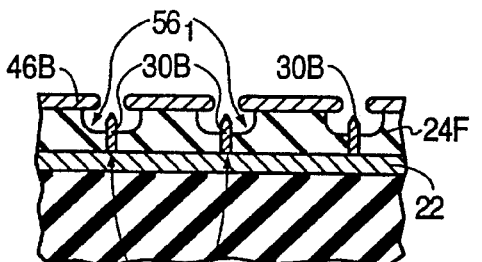
Figure 2J:
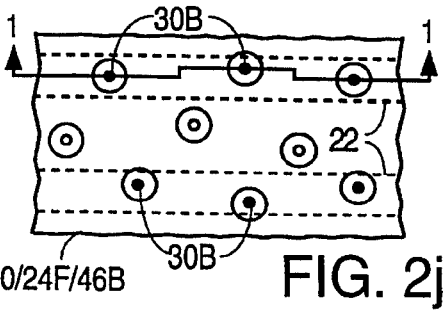

FIGS. 1j and 2j show the final structure in which item 46B is the edge-rounded remainder of gate layer 46A. Items 30B are the sharpened remainders of filaments 30. Each cavity $56_1$, in combination with underlying pore 28A, forms a dielectric open space for corresponding sharpened filament 30B.

Openings 54 can alternatively be created by etching through holes whose diameter is considerably smaller than openings 54 rather than using apertures 52 whose diameter is approximately the same as openings 54. More specifically, after forming charged-particle tracks 50 in the structure of FIG. 1c, track segments 50B are etched to create relatively narrow pores through insulating layer 48. The portions of metal layer 46 exposed through these narrow pores are removed with an isotropic etchant that attacks metal layer 46 much more than insulating layers 24 and 48 to form openings 54 down to layer 24. Because the etch is isotropic, openings 54 now extend slightly under insulating layer 48. From this point on, the structure is further processed in the manner described above for FIGS. 1f–1j.

Because electron-emissive elements 30B are formed by a process that involves electrochemically filling pores $28_1$ with metal and then (as desired) removing part of the metal to form sharpened tips, the upper ends of elements 30B are normally situated below the bottom of patterned gate layer 46A or 46B. In certain applications, it is desirable for the electron-emissive elements in a gated field emitter to extend upward beyond the bottom of the gate electrode and sometimes even beyond the top of the gate electrode. Turning to FIGS. 3a–3e (collectively "FIG. 3"), they illustrate a sequence of steps for converting filaments 30 in the structure of FIG. 1i into pointed electron-emissive filaments that extend beyond the top of the gate electrode. For convenience, FIG. 1i is repeated here as FIG. 3a.

Figure 3A:
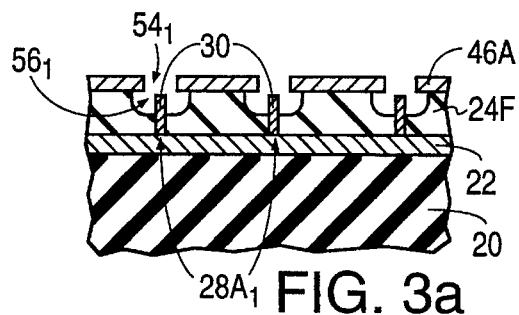
FIGS. 3a, 3b, 3c, 3d, and 3e are cross-sectional front views representing an alternative set of steps performable on the structure of FIG. 1i for manufacturing a gated field emitter according to the invention.
Figure 3B:
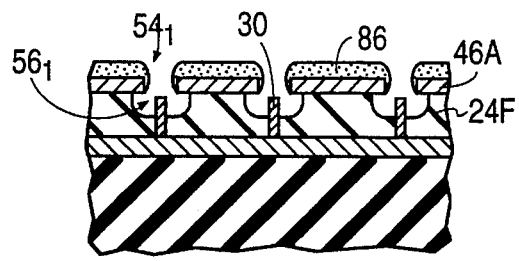

A thin masking layer 86 of a lift-off material is formed on the partially finished field-emission structure of FIG. 3a in such a way that the lift-off material fully covers gate layer 46A but does not cover the tops of filaments 30. See FIG. 3b. Preferably, none of the lift-off material is present in the portions of cavities $56_1$ situated to the sides of filaments 30. The thickness of layer 86 is typically a fraction of (i.e., less than) the average diameter of gate openings 54.

Lift-off layer 86 is typically created according to a physical deposition technique, such as evaporation, in which atoms of the lift-off material impinge, and thereby accumulate, on the top of gate layer 46A in a direction that is at a small angle to the (unshown) lower surface of substrate 20 and thus at a small angle to the top of gate layer 46A. To achieve a spatially uniform deposition, either the partially finished field emitter or the source of the lift-off material is rotated at a constant speed about an axis perpendicular to the lower surface of substrate 20. The impingement angle is set at a sufficiently small value as to enable some of the lift-off material to accumulate on the lateral edges of gate layer 46A along gate openings 54, but to substantially inhibit any of the lift-off material from passing through openings 54.

Figure 3C:
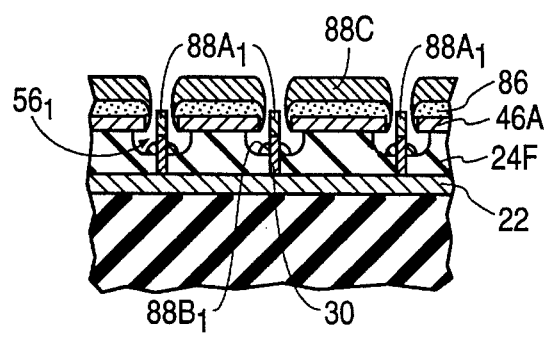

Next, blunted metallic tips $88A_1$ are respectively formed on the upper surfaces of filaments 30 as depicted in FIG. 3c. Metal tips $88A_1$ are preferably created according to a physical deposition technique, such as evaporation, in which atoms of the tip metal are directed toward the top of the field-emission structure in a direction largely perpendicular to the lower surface of substrate 20 and thus in a direction largely perpendicular to the top of gate layer 46A. As a result, atoms of the tip metal pass through gate openings $54_1$ to form tips $88A_1$.

During the tip deposition, annular portions $88B_1$ of the tip metal respectively accumulate around filaments 30 at the bottoms of cavities $56_1$. Atoms of the tip metal also pass through gate openings $54_2$ (not shown) to form pieces (not shown) of the tip metal along parts of insulating layer 24F exposed through cavities $56_2$ (also not shown). These pieces of the tip metal do not contact lower conductive region 22. Accordingly, they do not affect the electrical operation of the final field emitter.

A layer 88C of the tip metal accumulates on lift-off layer 86 during the tip deposition. As the thickness of layer 88C increases, layer 88C typically grows slightly in the lateral direction. Although this lateral growth gradually reduces the size of the openings through which the tip metal can deposit on filaments 30 and does affect the shape of metal portions $88B_1$, the deposition of the tip metal is terminated before the tip-deposition openings through layer 88C become so small that the tip metal starts to accumulate non-uniformly (e.g., to start forming conically-ended tips) on the upper surfaces of filaments 30.

Figure 4A:
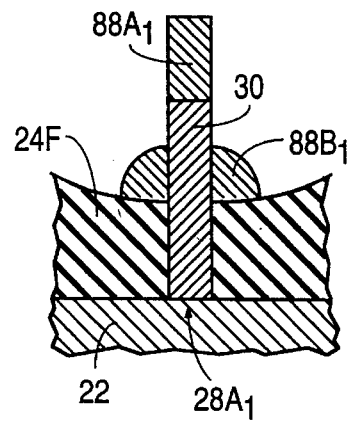
FIGS. 4a and 4b are respective expanded cross-sectional front views of one of the electron-emissive elements in FIGS. 3c and 3e.

The combination of filament 30 and overlying tip $88A_1$ forms a composite lengthened electron-emissive filament. FIG. 4a presents an enlarged view of one of lengthened filaments $30/88A_1$ at the stage depicted in FIG. 3c. The presence of metal portion $88B_1$ along the length of filament $30/88A_1$ is normally not electrically significant.

A noble metal is preferably employed for the tip metal. In a typical implementation, the tip metal consists of platinum when components 22, 46A, and 30 are respectively formed with chromium, molybdenum, and platinum. In this case, each filament 30 and overlying tip $88A_1$ consist of the same metal. Alternatively, the tip metal can be a non-noble metal, such as molybdenum or niobium, capable of being physically deposited in the way described above. The amount of tip metal deposited depends on the desired length (or height) of the final electron-emissive elements.

Lift-off layer 86 is now removed by subjecting the structure to a chemical etchant that attacks the lift-off material but does not significantly attack any other materials in the structure. During the removal of layer 86, layer 88C is lifted off to produce the structure shown in FIG. 3d.

Figure 3D:
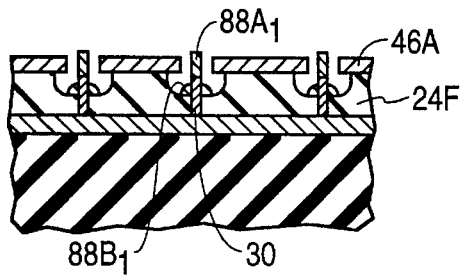
Figure 3E:
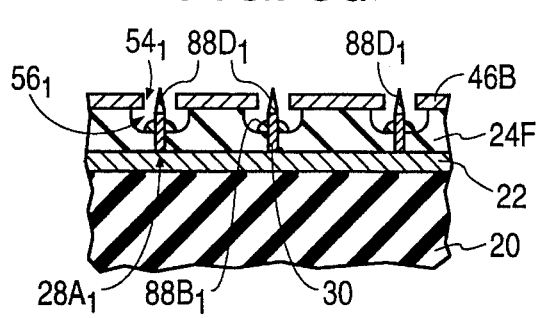
Figure 4B:
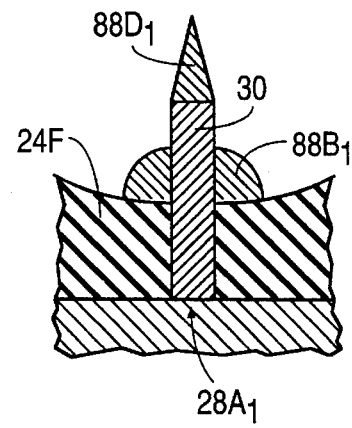

An electropolishing and etching operation is performed in the manner described above to tailor and sharpen the upper ends of filaments $30/88A_1$. As in the fabrication process of FIG. 1, the electropolishing step enables filaments $30/88A_1$ to become more uniform in length. During the filament etch, the upper ends of filaments $30/88A_1$ are sharpened. FIG. 3e illustrates the exemplary case in which substantially all the tailoring and sharpening is done on upper ends $88A_1$ which thereby become pointed tips $88D_1$. Each cavity $56_1$ in combination with underlying pore $28A_1$ now forms a dielectric open space for corresponding filament $30/88D_1$. FIG. 4b presents an enlarged view of typical filament $30/88D_1$ at the stage shown in FIG. 3e.

A further electropolishing step is normally also performed in the manner described above to round the edges of gate layer 46A overlying cavities $56_1$. Patterned gate electrode 46B in FIG. 3e is the rounded-edge remainder of gate layer 46A.

FIGS. 5a–5e (collectively "FIG. 5") depict another sequence of steps for converting filaments 30 in the gated field-emission structure of FIG. 1i into longer pointed filaments. For convenience, FIG. 1i is likewise repeated here as FIG. 5a. Lift-off layer 86 is formed on gate layer 46A in the manner described above. See FIG. 5b which is a repeat of FIG. 3b. At this point, the process of FIG. 5 diverges from that of FIG. 3.

Figure 5A:
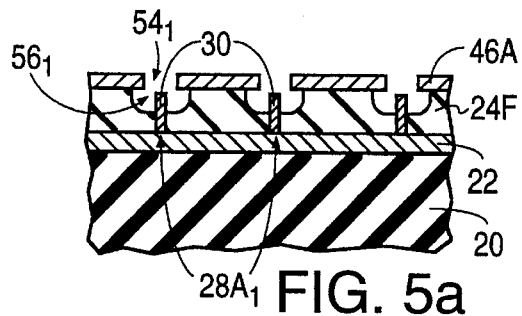
FIGS. 5a, 5b, 5c, 5d, and 5e are cross-sectional front structural views representing a further set of steps performable on the structure of FIG. 1i for manufacturing a gated field emitter according to the invention.
Figure 5B:
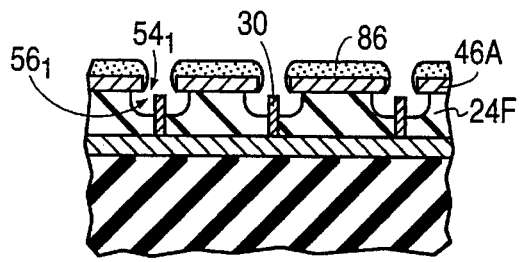
Figure 5C:
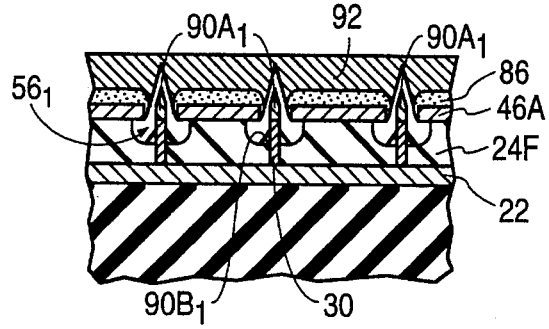

Pointed metallic tips $90A_1$ are formed directly on the upper surfaces of filaments 30 as indicated in FIG. 5c. Tips $90A_1$ basically consist of cylinders with conically shaped upper ends.

Metal tips $90A_1$ are typically created according to a double-source physical deposition technique in which (1) atoms of a tip metal deposit on top of the structure in a direction largely perpendicular to the (unshown) lower surface of substrate 20 and thus in a direction largely perpendicular to the upper surface of gate layer 46A and (2) atoms of a closure material simultaneously impinge, and thereby accumulate, on the upper surface of layer 46A in a direction that is at a small angle to the lower surface of the substrate 20 while either the partially finished field emitter or the sources of the tip and closure materials are rotated at constant speed about an axis perpendicular to the lower surface of substrate 20 in order to obtain a spatially uniform deposition. Both parts of the deposition are usually done by evaporation.

The impingement angle for the closure material is small enough that substantially none of the closure material passes through gate openings 54 to accumulate on filaments 30 or on the portions of insulating layer 24F exposed through cavities 56. Only the tip metal passes through openings 54. Accordingly, the tip metal accumulates on filaments 30 to form pointed tips $90A_1$. Annular portions $90B_1$ of the tip metal also respectively accumulate around filaments 30 at the bottoms of cavities $56_1$. As in the process of FIG. 3, electrically inconsequential pieces (not shown) of the tip metal are formed along the parts of insulating layer 24F exposed through cavities $56_2$.

A composite layer 92 of the tip and closure materials accumulates on lift-off layer 86 during the tip deposition. Because the impingement angle for the closure material is less than 90°, composite layer 92 expands laterally as its thickness increases so as to progressively close the openings through which the tip metal can accumulate to form tips $90A_1$ and metal portions $90B_1$. The deposition is conducted for a time sufficiently long that the tip-deposition openings through layer 92 close fully, and layer 92 becomes a continuous film. Consequently, filament tips $90A_1$ are created generally in the shape of cones. Each filament 30 in combination with overlying tip $90A_1$ constitutes a lengthened, pointed electron-emissive filament.

Figure 6:
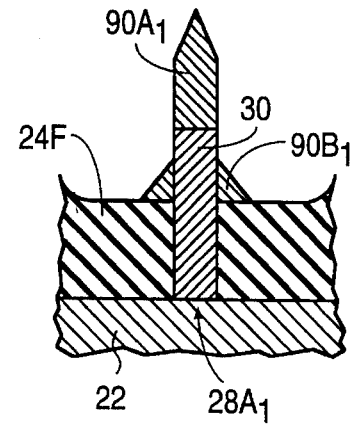
FIG. 6 is an expanded cross-sectional front view of one of the electron-emissive elements in FIG. 5c.

The tip metal is normally the same as in the process of FIG. 3. The height of tips $90A_1$ depends on the rate at which the tip and closure materials are deposited and on the impingement angle for the closure material. FIG. 6 presents an enlarged view of one of filaments $30/90A_1$ at the stage shown in FIG. 5c.

Lift-off layer 86 and composite layer 92 are subsequently removed according to a conventional etching technique. See FIG. 5d.

Figure 5D:
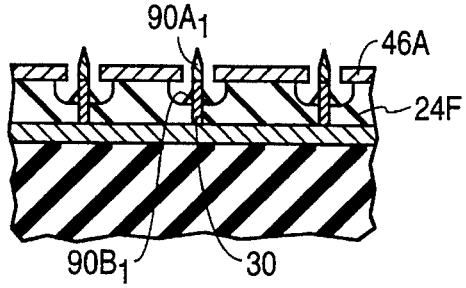
Figure 5E:
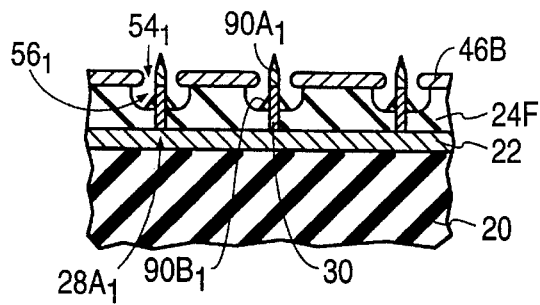

An electropolishing step is preferably done to round the edges of gate layer 46A overlying cavities $56_1$. The electropolishing is preferably conducted in the way described above. FIG. 5e shows the final structure in which item 46B is again the rounded-edge remainder of gate layer 46A. Because the upper ends of metal tips $90A_1$ are generally in the shape of cones, there is no need to perform an electropolishing and etching operation on tips $90A_1$.

The process in FIG. 5 can be modified in a number of ways. The deposition of the closure material can be deleted; advantage can be taken of the fact that layer 92, now solely consisting of the tip metal, expands slightly in the lateral direction as its thickness increases. In this case, tips $90A_1$ grow higher. The deposition of the tip and closure materials can be terminated before the tip-deposition openings through layer 92 fully close. Since tips $90A_1$ are thereby produced with unsharpened upper ends, an abbreviated electropolishing and etching operation can be performed to sharpen tips $90A_1$.

The diameter of the base of each metal tip $90A_1$ in FIG. 5e is the same as the diameter of underlying filament 30. Alternatively, filamentary electron-emissive elements with conical tips can be created in which the diameter at the base of each tip is considerably greater than the diameter of the underlying filament. FIGS. 7a–7h (collectively "FIG. 7") illustrate a sequence of fabrication steps by which the process of FIG. 1 is modified starting at the stage shown in FIG. 1f, repeated here as FIG. 7a, to create a gated field emitter having conically pointed filamentary electron-emissive elements whose tips are respectively wider at their bases than the underlying filamentary segments.

Figure 7A:
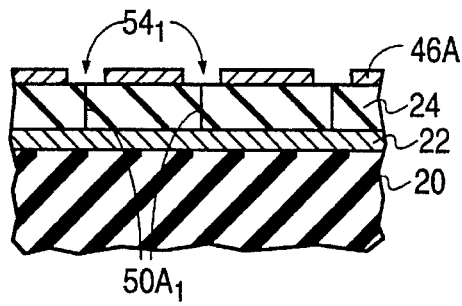
FIGS. 7a, 7b, 7c, 7d, 7e, 7f, 7g, and 7h are cross-sectional front structural views representing an alternative set of steps performable on the structure of FIG. 1f for manufacturing a gated field emitter according to the invention.
Figure 7B:
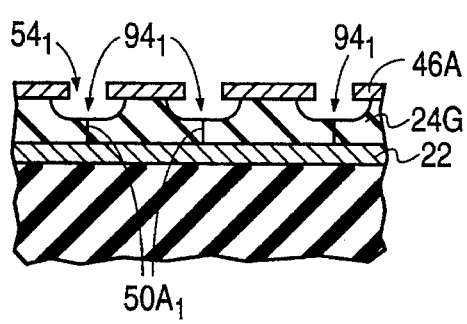

Portions of insulating layer 24 exposed through gate openings $54_1$ are removed with an isotropic chemical etchant to form cavities $94_1$ that extend partway, but not all the way, through layer 24 as shown in FIG. 7b. Portions of layer 24 exposed through gate openings $54_2$ (not shown) are simultaneously removed to form cavities $94_2$ (likewise not shown) that extend partway through layer 24. Each of cavities $94_1$ and $94_2$ (collectively "94") extends slightly under gate layer 46A.

The etchant preferably attacks the damaged material along track segments 50A at approximately the same rate as the undamaged insulating material of layer 24. Consequently, the portion of each track segment 50A, of which only segments $50A_1$ are shown in FIG. 7b, at the bottom of corresponding cavity 94 is not significantly attacked during the etch. The remainder of insulating layer 24 is indicated as item 24G in FIG. 7b.

Figure 7C:
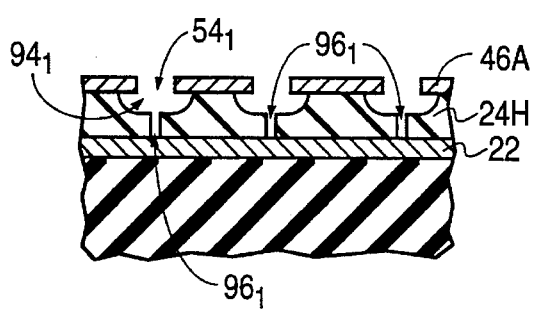

The structure is now brought into contact with a chemical etchant that attacks the damaged 50A track material much more than the undamaged material of insulating layer 24G. Pores $96_1$ are thereby created through layer 24G along the remaining portions of track segments $50A_1$ at the bottom of cavities $94_1$ as shown in FIG. 7c. Pores $96_2$ (not shown) are simultaneously etched through layer 24G along the remaining (unshown) portions of track segments $50A_2$ at the bottom of cavities $94_2$ (also not shown). Item 24H in FIG. 7c is the remainder of insulating layer 24G.

The etch utilized to form pores $96_1$ and $96_2$ (collectively "96") is performed uniformly in largely the same manner as that employed to create pores 28. Each pore 96 is thereby centered on the location of corresponding track segment 50A. Pores 96 typically have the same physical/spatial characteristics as given above for pores 28. In addition to being narrower than overlying cavity 94, each pore 96 is considerably narrower than corresponding gate opening 54. Because (a) each track segment 50B was in a straight line with corresponding track segment 50A and (b) each gate opening 54 is centered on the location of corresponding track segment 50B, each opening 54 is centered on corresponding pore 96.

Figure 7D:
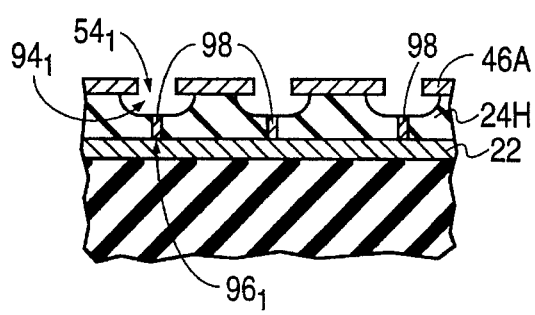
Figure 7E:
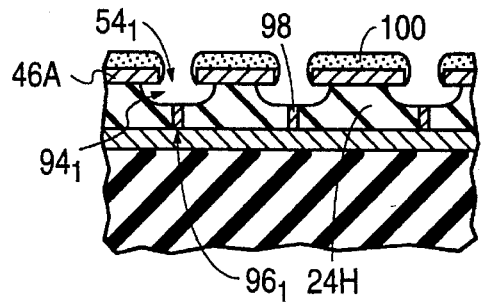

An appropriate filament metal is electrochemically deposited to create metal filaments 98 that substantially fill pores $96_1$ over lower conductive region 22 as shown in FIG. 7d. The filament deposition is performed in the manner used to create filaments 30 in the process of FIGS. 1 and 2. Since there is no electrical contact at the bottoms of pores $96_2$ located directly above substrate 20, substantially none of the filament material accumulates in pores $96_2$. Consequently, the electrochemical nature of the process enables the deposition to be selective even through there is a gate opening for each pore 96.

Filaments 98 can be formed with a noble metal such as platinum, gold, or palladium. The filament metal can also be a non-noble metal such as nickel, copper, cobalt, molybdenum, or niobium.

Metal filaments 98 have the same basic length, diameter, length-to-diameter, and cross-sectional characteristics as filaments 30. In particular, the length-to-maximum-diameter ratio for filaments 98 is preferably 10 or more. Although a comparison of FIG. 7d to FIG. 1i might seem to indicate that filaments 98 are shorter than filaments 30, filaments 98 can be made longer than filaments 30 by increasing the thickness of insulating layer 24 and appropriately controlling the depth of the cavity etch. As with filaments 30, the centering that results from the track formation and etching enables filaments 98 to be self-aligned to gate openings $54_1$ and thus to gate layer 46A.

A thin masking layer 100 of a lift-off material is formed on the field-emission structure in such a manner that the lift-off material fully covers gate layer 46A but does not cover the tops of filaments 98. See FIG. 7e. Lift-off layer 100 is preferably created according to the technique used to create lift-off layer 86 in the process of FIG. 3 or 5.

Figure 7F:
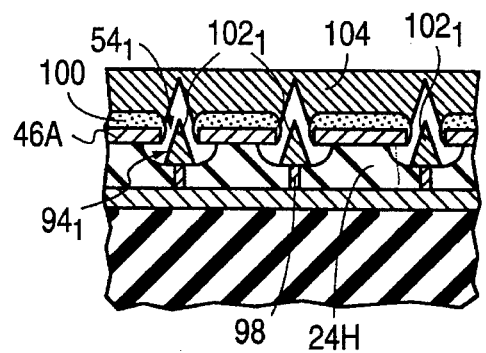

A tip metal is introduced through gate openings $54_1$ into cavities $94_1$ to form pointed, generally conical metallic tips $102_1$ that respectively contact filaments 98 as indicated in FIG. 7f. The tip metal is normally the same as in the process of FIG. 5.

The base diameter of each metallic tip $102_1$ is normally greater than the diameter of underlying filament 98. Consequently, tips 102, extend laterally over adjoining portions of insulating layer 24H. Each filament 98 and overlying tip $102_1$ form a composite electron-emissive element whose maximum diameter occurs at a point between—i.e., spaced apart from—the ends of that element.

Metal tips $102_1$ are preferably formed according to a double-source physical deposition technique using the tip metal and a closure material in the same way that tips $90A_1$ are created in the process of FIG. 5. The impingement angle for the closure material, which helps close the openings through which the tip metal enters cavities 94, is sufficiently small that substantially none of the closure material passes through gate openings $54_1$, to accumulate on filaments 98 or on portions of insulating layer 24H exposed through cavities $94_1$. The tip metal also passes through gate openings $54_2$ (not shown) to form pieces (not shown) of the tip metal along parts of layer 24H exposed through cavities $94_2$ (also not shown). These pieces of the tip metal are electrically inconsequential since they do not contact lower conductive region 22.

During the double-source tip deposition, a composite layer 104 of the tip and closure materials accumulates on lift-off layer 100 in the same way that composite layer 92 is created in the process of FIG. 5. As the thickness of composite layer 104 increases, the tip-deposition openings through which the tip metal passes to form tips $102_1$ progressively close in a substantially uniform manner. Tips $102_1$ are thus formed in the shape of cones respectively centered on filaments 98. Accordingly, tips $102_1$ are self-aligned to gate openings $54_1$. Each filament 98 and overlying metal cone $102_1$ form a composite electron-emissive element.

Figure 7G:
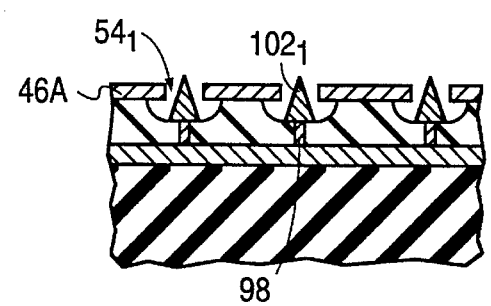

Lift-off layer 100 and composite layer 104 are removed in a conventional manner. FIG. 7g illustrates the resulting structure.

Figure 7H:
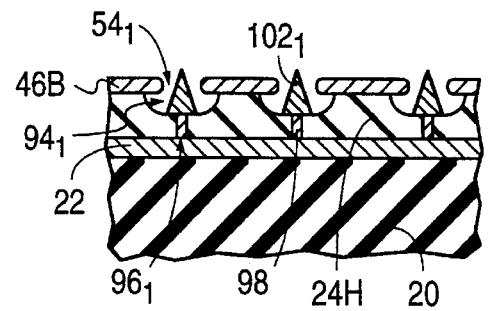

The final step in the fabrication process is to round the edges of gate layer 46A overlying cavities $94_1$ as shown in FIG. 7h. The edge rounding is preferably done by an electropolishing step in the way described above. Again, item 46B in FIG. 7h is the rounded-edge remainder of gate layer 46A. Each cavity $94_1$ and underlying pore $96_1$ form a dielectric open space for corresponding electron-emissive element $98/102_1$. Since pores $96_1$ are distributed randomly across insulating layer 24H, electron-emissive elements $98/102_1$ are situated at random locations above lower conductive region 22.

FIGS. 8a–8h (collectively "FIG. 8") illustrate how a gated field emitter can be fabricated according to a variation of the composite process of FIGS. 1a–1f and FIG. 7 to facilitate creation of cavities that extend partway through insulating layer 24 along its upper surface below the gate openings. After forming lower conductive region 22 on substrate 20, insulating layer 24 is deposited on conductive region 22 as a lower sublayer 24I and an upper sublayer 24J which is selectively etchable with respect to sublayer 24I. Gate layer 46 and further insulating layer 48 are then sequentially deposited to produce the initial structure shown in FIG. 8a.

Figure 8A:
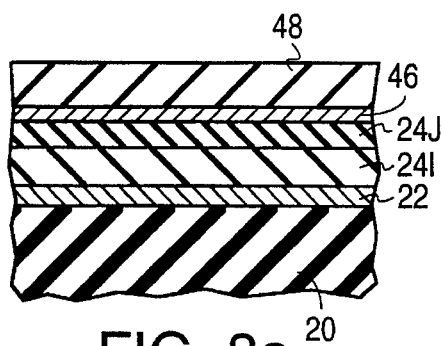
FIGS. 8a, 8b, 8c, 8d, 8e, 8f, 8g, and 8h are cross-sectional front structural views representing steps in manufacturing a gated field emitter according to the invention.
Figure 8B:
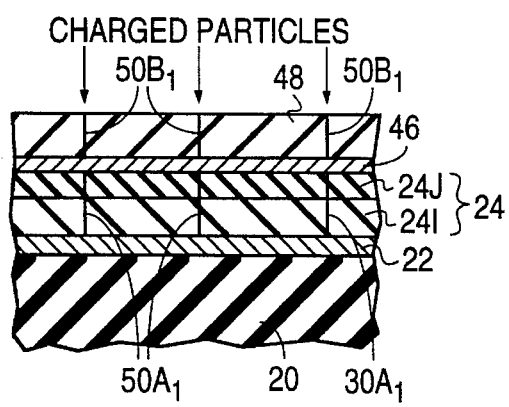
Figure 8C:
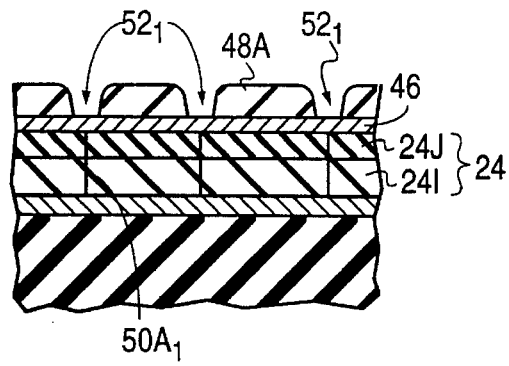
Figure 8D:
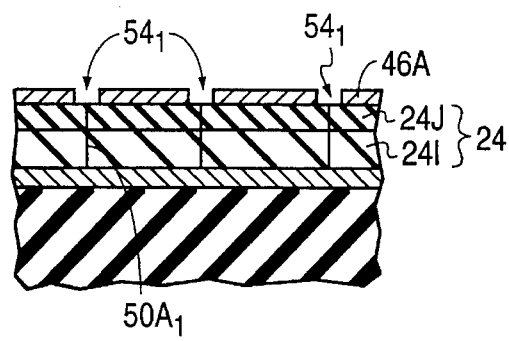

FIG. 8b illustrates the formation of tracks 50 through insulating layer 48 and sublayers 24I and 24J of insulating layer 24. Track segments $50A_1$ extend through both sublayers 24I and 24J down to lower conductive region 22. Track segments $50A_2$ (not shown) extend through sublayers 24I and 24J directly down to substrate 20. The incidental structural facets created as a result of track segments $50A_2$ are not electrically consequential and, for simplicity, are not mentioned further in the discussion of FIG. 8. FIGS. 8c and 8d illustrate the formation of apertures $52_1$ through insulating layer 48, the formation of gate openings $54_1$ through gate layer 46, and the removal of the remainder 48A of layer 48.

Figure 8E:
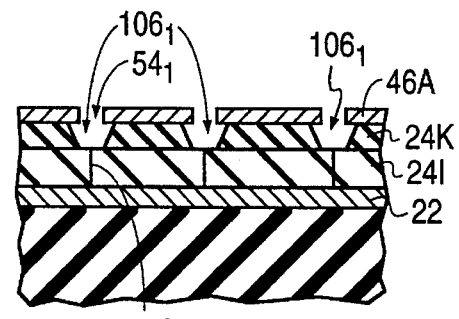

Portions of insulating sublayer 24J exposed through gate openings $54_1$ are removed with an isotropic chemical etchant that attacks sublayer 24J much more than sublayer 24I to form cavities $106_1$ in composite insulating layer 24. The etch is preferably done in a single step. Alternatively, the portions of track segments $50A_1$ extending through sublayer 24J can be etched to form pores through layers 24J after which the pores are widened to create cavities $106_1$. Insulating sublayer 24I acts as an etch stop to prevent cavities $106_1$ from going deeper into layer 24. FIG. 8e illustrates the resulting structure in which item 24K is the remainder of layer 24J.

Figure 8F:
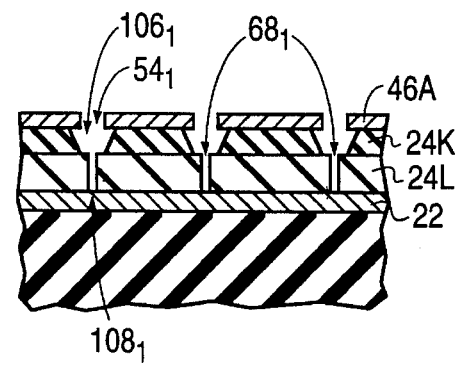
Figure 8G:
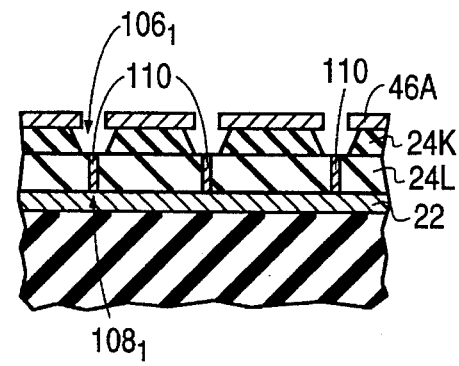
Figure 8H:
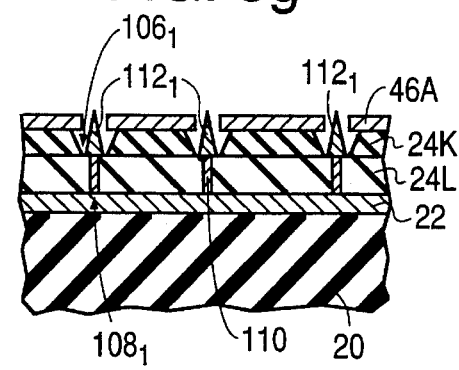

The remainder of the fabrication is conducted in the manner discussed above for FIGS. 7c–7h. FIGS. 8f–8h illustrate the etching of pores $108_1$ through insulating sublayer 24I, the formation of metallic filaments 110 in pores $108_1$, and the formation of pointed, generally conical metal tips $112_1$ that contact filaments 110 in a self-aligned manner within cavities $106_1$. Item 24L in FIGS. 8f–8h is the remainder of sublayer 24I. An electropolishing step is typically employed to round the edges of the remainder 46A of gate layer 46.

As with the electron-emissive elements fabricated according to the process of FIG. 7, the base diameter of each cone $112_1$ in FIG. 8h is usually greater than the diameter of underlying filament 110. Cones $112_1$ therefore extend laterally over adjoining material of insulating sublayer 24L. Each filament 110 and overlying cone $112_1$ form a composite electron-emissive element whose maximum diameter occurs at a point between the ends of that element.

The metal portions that connect lower conductive region 22 to conical tips $88D_1$, $90A_1$, $102_1$, and $112_1$ in the structures produced according to the processes of FIGS. 3, 5, 7, and 8 have been described as filaments. However, these metal portions could simply be metallic pedestals that do not necessarily have the elongated characteristics of filaments, such as the filamentary characteristics described above for filaments 30 in the process of FIGS. 1 and 2. For example, the length (or height) of a pedestal could be less than its diameter. In manufacturing a gated field emitter according to the process of FIG. 1 as modified in accordance with the steps of FIG. 3, 5, 7, or 8, each reference to a filament can be broadened to a pedestal.

The process of FIG. 1 can be modified to create a gated field-emission structure in which the electron-emissive elements consist solely of cones. That is, no filaments or pedestals lie between lower conductive region 22 and the cones. FIGS. 9a–9e (collectively "FIG. 9") and FIGS. 10a–10e (collectively "FIG. 10") illustrate a sequence of steps for creating such a cone-based gated field emitter starting from the structure depicted in FIGS. 1f and 2f. These two figures are respectively repeated as FIGS. 9a and 10a.

Figure 9A:
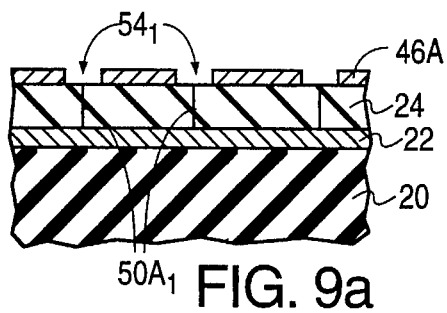
FIGS. 9a, 9b, 9c, 9d, and 9e are cross-sectional front structural views representing a further set of steps performable on the structure of FIG. 1f for manufacturing a gated field emitter according to the invention.
Figure 9B:
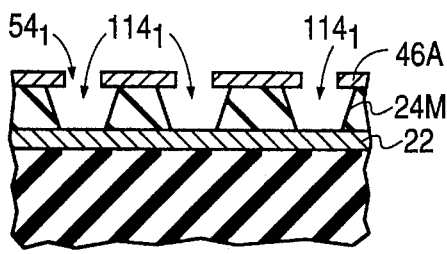
Figure 10A:
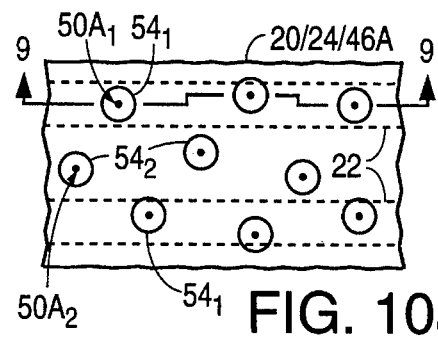
FIGS. 10a, 10b, 10c, 10d, and 10e are plan views respectively corresponding to FIGS. 9a–9e. The cross-sections of FIGS. 9a–9e are taken through plane 9—9 in FIGS. 10a–10e.
Figure 10B:
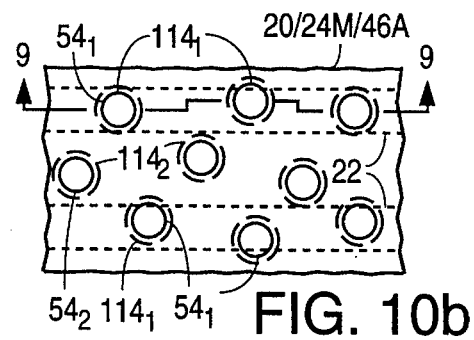

Using gate layer 46A as an etch mask, dielectric open spaces $114_1$ are etched through insulating layer 24 down to lower conductive region 22 at the locations of gate openings $54_1$. See FIGS. 9b and 10b. Dielectric open spaces $114_2$ are similarly formed through layer 24 at the locations of gate openings $54_2$. Each of dielectric open spaces $114_1$ and $114_2$ (collectively "114") extends slightly under gate layer 46A. The etch is preferably done in one step, but can be performed in two steps as described above for cavities $106_1$ in the process of FIG. 8. Item 24M in FIG. 9b is the remainder of layer 24.

Figure 9C:
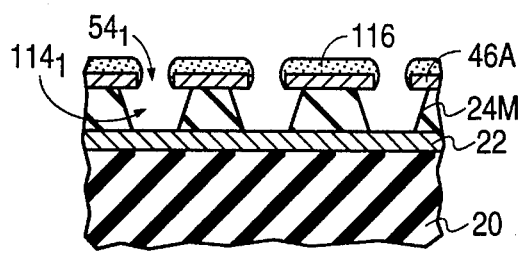
Figure 9D:
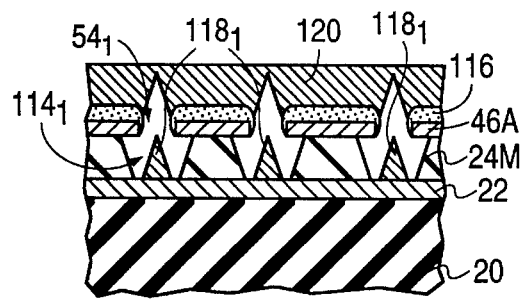
Figure 10C:
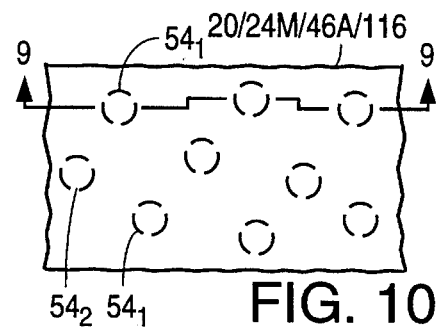
Figure 10D:
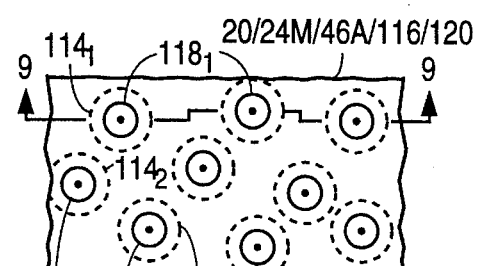
Figure 10E:
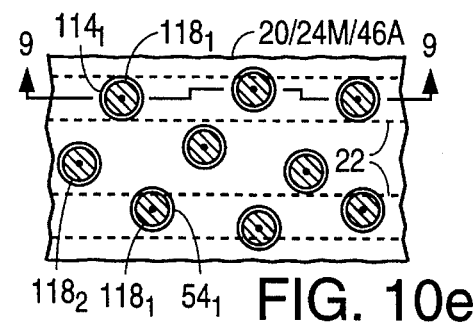

A thin masking layer 116 of a lift-off material is created on the structure so as to fully cover gate layer 46A as shown in FIGS. 9c and 10c. Lift-off layer 116 extends slightly over the edges of gate layer 46A along openings 54. Layer 116 is preferably created according to the technique employed to form lift-off layer 86 in the process of FIG. 5.

A cone metal is introduced through gate openings $54_1$ into cavities $114_1$ to form generally conical electron-emissive elements $118_1$ on lower conductive region 22. See FIGS. 9d and 10d. Electron-emissive cones $118_1$ are preferably formed according to the double-source physical deposition technique used to create filament tips $90A_1$ in the process of FIG. 5. The tip metal in the process of FIG. 5 is now the cone metal. Some of the cone metal also passes through gate openings $54_2$ to form metal portions $118_2$ in cavities $114_2$. Metal portions $118_2$ do not contact lower conductive region 22 and therefore do not affect the electrical operation of the final field emitter.

During the cone deposition, a composite layer 120 of the cone and closure materials accumulates on lift-off layer 116 in the same manner that composite layer 92 is formed in the process of FIG. 5. The cone-deposition openings through which the cone metal enters cavities 114 close in a substantially uniform manner. As a result, tips $118_1$ are formed in the shape of cones self-aligned to gate openings $54_1$.

Figure 9E:
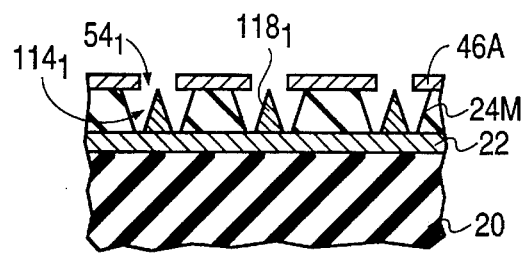

Layers 116 and 120 are removed in a conventional manner. FIG. 9e depicts the resulting structure. Because openings $54_1$ are situated at random locations across gate layer 46A, cones $118_1$ are located in random places above lower conductive region 22. An electropolishing step may be performed in the manner described above to round the edges of the remainder 46A of gate layer 46.

Various modifications involving the lift-off layers can be made to the processes of FIGS. 3, 5, 7, and 8 and to the process of FIGS. 9 and 10. Instead of creating a lift-off layer by an angled deposition on top of gate layer 46A after cavities 56, 94, 106, or 114 have been formed in insulating layer 24, the lift-off layer can be provided at an earlier stage in the process. For example, the lift-off layer can be deposited on gate layer 46 at the beginning of the process before the deposition of further layer 48 in FIG. 1b. With the lift-off layer now situated between layers 46 and 48, the lift-off layer undergoes the same operations that layer 48 undergoes except that the lift-off layer is not removed when the etched remainder 48A of layer 48 is removed. In fact, the lift-off layer could even consist of layer 48A.

FIGS. 11 and 12 illustrate the starting point for manufacturing implementations of the present field emitter in which lower conductive region 22 consists of a highly conductive layer 22A situated under a highly resistive (but still conductive) layer 22B. As shown in FIG. 12, each of the lines that form region 22 consists of segments of both of layers 22A and 22B. Highly conductive layer 22A consists of one or more of the materials described above for layer 22. Resistive layer 22B is typically formed with cermet (ceramic with embedded metal particles), doped polycrystalline silicon, or doped silicon carbide.

FIGS. 13.1–13.4 respectively depict how the final structures of FIGS. 1j, 3e, 7h, and 9e appear when lower conductive region 22 consists of highly conductive layer 22A and highly resistive layer 22B. The lower ends of electron-emissive elements 30B, $30/88D_1$, $98/102_1$, or $118_1$ contact resistive layer 22B. The resistance between each electron-emissive element and layer 22A is at least $10^6$ ohms, typically $10^8$ ohms or more.

The processing techniques utilized in fabricating the gated field emitter of FIGS. 1 and 2 can be readily extended to create a gated area field-emission structure having one or more additional control electrodes above the gate electrode.

Moving to FIGS. 14a–14l (collectively "FIG. 14"), they illustrate how a gated field emitter having a focusing control electrode is so manufactured. This field emitter is also suitable for flat-panel television applications.

Figure 14A:
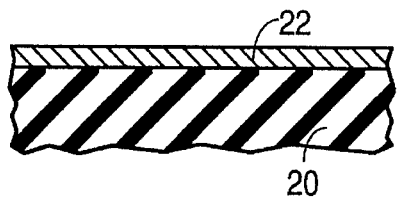
FIGS. 14a, 14b, 14c, 14d, 14e, 14f, 14g, 14h, 14i, 14j, 14k, and 14l are cross-sectional front structural views representing steps in manufacturing a gated field emitter that incorporates a focusing electrode according to the invention.

The field emitter is built on insulating substrate 20 over which lower conductive region 22 is provided as shown in FIG. 14a. Insulating layer 24, metal layer 46, and second insulating layer 48 are formed in sequence on the top of the structure. See FIG. 14b. Components 20, 22, 24, 46, and 48 all have the characteristics described above.

Figure 14B:
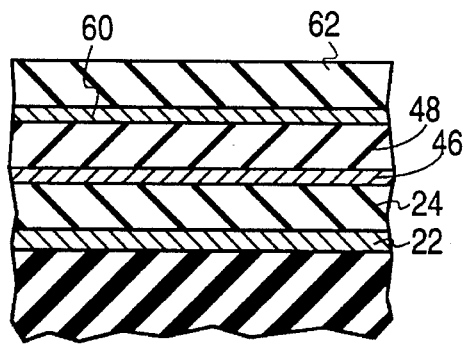

Continuing with FIG. 14b, a second electrically conductive layer 60 is formed on top of second insulating layer 48. Conductive layer 60 later becomes the focusing electrode. A further electrically insulating layer 62 is formed on top of layer 60. Layers 62 and 60 respectively have largely the same characteristics as insulating layer 48 and metal layer 46. Accordingly, layer 62 consists of insulating material, and layer 60 consists of metal.

The structure is subjected to energetic charged particles traveling in a direction largely perpendicular to the (unshown) lower substrate surface and thus in a direction generally perpendicular to the upper structural surface. The charged particles pass through layers 62, 60, 48, 46, and 24 and into the underlying material to form straight tracks through insulating layers 62, 48, and 24. See FIG. 14c.

Figure 14C:
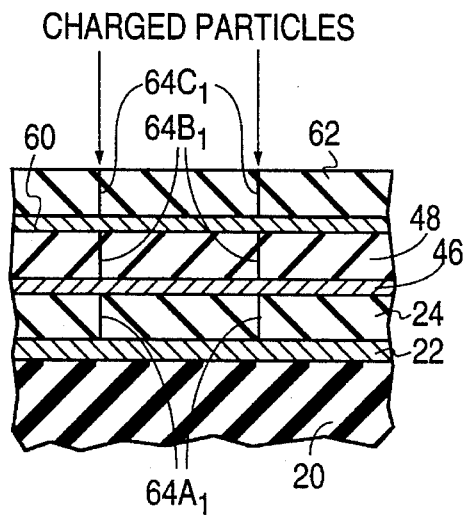
Figure 14D:
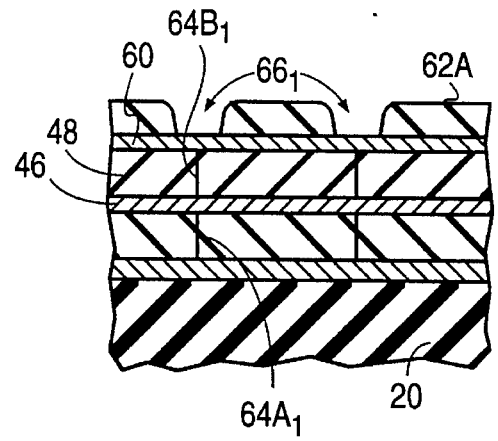

Reference symbols beginning with "64" are employed to indicate the charged-particle tracks in FIG. 14c. Each track is divided into (a) a "64A" segment extending through insulating layer 24, (b) a "64B" segment extending through insulating layer 48, and (c) a "64C" segment extending through insulating layer 62. The charged particles do not cause any significant damage to metal layers 60 and 46 and therefore do not create any tracks through layers 60 and 46. The tracks fall into two categories: (a) segments $64A_1$, $64B_1$, and $64C_1$ (collectively "$64_1$") extending respectively through portions of layers 24, 48, and 62 overlying lower conductive region 22, and (b) segments $64A_2$, $64B_2$, and $64C_2$ (collectively "$64_2$") extending respectively through portions of layers 24, 48, and 62 not overlying region 22. Track segments $64_2$, although not shown in the drawings, are analogous to track segments $50_2$—i.e., segments $50A_2$ and $50B_2$—depicted in FIGS. 2c and 2e for the process of FIGS. 1 and 2.

Charged-particle tracks $64_1$ and $64_2$ (collectively "64") extend parallel to one another in a direction generally perpendicular to the upper structural surface. Tracks 64 have the same basic characteristics, and are formed in the same way, as tracks 50 described above.

Generally circular pores are formed through insulating layer 62 along track segments 64C down to metal layer 60 by bringing layer 62 into contact with a chemical etchant that attacks the damaged 64C track material much more than the undamaged material of layer 62. The pores are then broadened by continuing the etch into the undamaged material to form apertures $66_1$ and $66_2$ respectively along the pores created by etching tracks $64B_1$ and $64B_2$. See FIG. 14d. Apertures $66_2$, although not shown in the drawings, are analogous to apertures $52_2$ depicted in FIG. 2d.

The etching procedure utilized to create apertures $66_1$ and $66_2$ (collectively "66") is performed uniformly in largely the same manner as that described above for creating apertures 52, with one notable difference. The etch time for apertures 66 is somewhat longer than the etch time for apertures 52. Consequently, apertures 66 have substantially the same characteristics as apertures 52 but are larger in diameter. In particular, apertures 66 reach an average diameter of 20–400 nm, typically 190 nm, along the bottom of the remainder 62A of insulating layer 62.

Figure 14E:
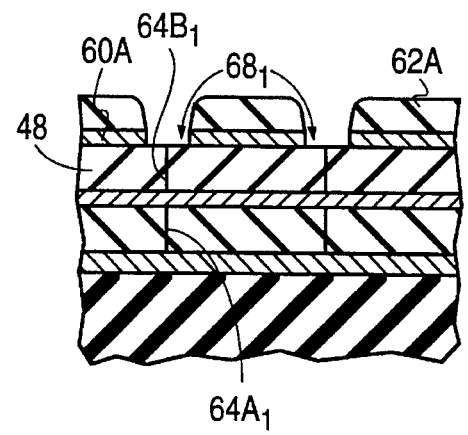

Using insulating layer 62A as an etch mask, the portions of metal layer 60 exposed via apertures 66 are removed with an anisotropic etchant. Openings $68_1$ are thereby created down to insulating layer 48 through the portions of layer 60 overlying lower conductive region 22 as shown in FIG. 14e. Openings $68_2$ are simultaneously created down to layer 48 through portions of layer 60 not overlying region 22. Although not shown in the drawings, openings $68_2$ are analogous to openings $54_2$ depicted in FIG. 2e. The remainder 60A of metal layer 60 in FIG. 14e is the patterned focusing electrode for the field emitter.

The etch procedure utilized to form openings $68_1$ and $68_2$ (collectively "68") is typically performed in the same way as the metal etch employed to create openings 54 in the process of FIGS. 1 and 2. As a result, each opening 68 is centered on the location of corresponding track segment 64C.

With portions of the upper surface of insulating layer 48 exposed at track segments 64B, pores are created in the damaged insulating material along segments 64B by bringing the structure into contact with a chemical etchant that attacks the damaged 64B track material much more than the undamaged material of layer 48. The etch is continued into the undamaged insulating material of layer 48 to broaden the pores. Apertures $70_1$ and $70_2$ are thereby created respectively along track segments $64B_1$ and $64B_2$. See FIG. 14f. Although not shown in the drawings, apertures $70_2$ are analogous to apertures $52_2$ shown in FIG. 2d.

Figure 14F:
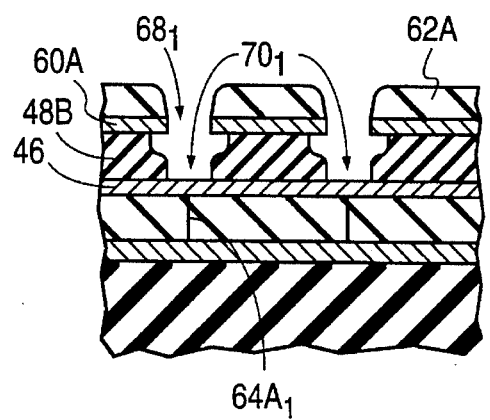

The thickness and lateral extent of insulating layer 62A may be reduced during the etch depending on whether insulating layer 48 is selectively etched with respect to layer 62A or not. FIG. 14f illustrates the case in which layer 62A is not significantly affected.

The procedure for etching apertures $70_1$ and $70_2$ (collectively "70") is performed in the laterally uniform manner described above for etching apertures 52 in the process of FIGS. 1 and 2. Small pieces of insulating material lying below focusing layer 60A along openings 68 are normally removed during the etch so as to undercut layer 60A slightly. Item 48B in FIG. 14f is the remainder of insulating layer 48. Aside from the undercutting of layer 60A, apertures 70 have substantially the same characteristics as apertures 52, including the same average aperture diameter along gate layer 46.

Figure 14G:
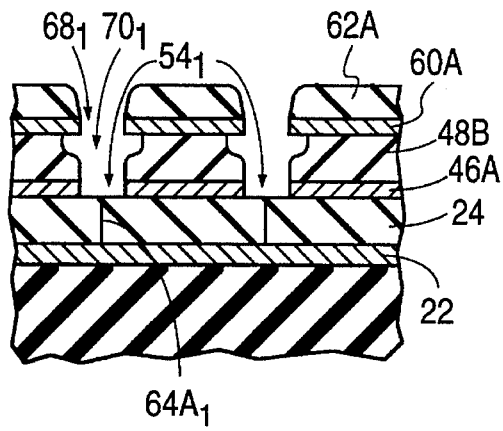
Figure 14J:
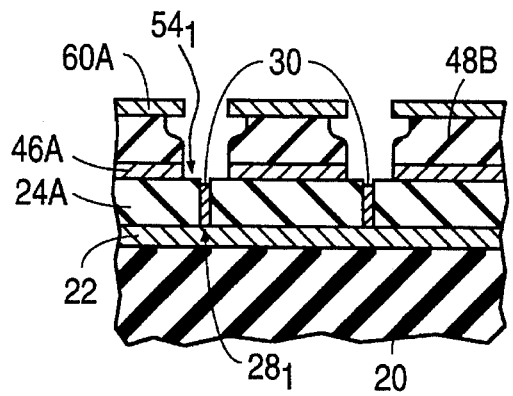

Using insulating layer 48B as an etch mask, the portions of metal layer 46 exposed through apertures $70_1$ are removed with an anisotropic etchant to create generally circular openings $54_1$ down to portions of insulating layer 24 that overlie lower conductive region 22 as shown in FIG. 14g. The portions of layer 46 exposed via apertures $70_2$ are simultaneously removed to create generally circular openings $54_2$ (not shown) down to the portions of layer 24 situated directly above substrate 20. The remaining portion 46A of gate layer 46 in FIG. 14g is again the gate electrode for the field emitter.

The etch technique employed to create openings 54 here is performed in the same way as in the process of FIGS. 1 and 2. Accordingly, each opening 54 is centered on the location of corresponding track segment 64B.

Figure 14H:
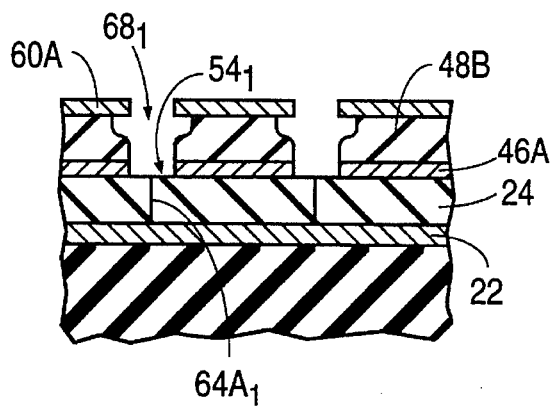

In the typical case where the anisotropic etchant used to create gate openings 54 is also capable of significantly attacking focusing electrode 60A, insulating layer 62A is removed at some point after openings 54 are created. This can, for example, be done directly after formation of openings 54 as shown in FIG. 14h. If the etchant does not significantly attack electrode 60A, layer 62A can be removed between the step in which openings 68 are created (to define electrode 60A) and the step in which openings 54 are created.

Except for the presence of metal layer 60A and insulating layer 48B, the structure of FIG. 14h is substantially the same as the structure of FIG. 1f. Track segments $64A_1$ in FIG. 14h are the same as track segments $50A_1$ in FIG. 1f. Subject to some additional processing on layers 60A and 48B, the structure of FIG. 14h is further processed in the same way as the structure of FIG. 1f. FIGS. 14i–14l respectively correspond to FIGS. 1g–1j. The processing description presented above in connection with FIGS. 1g–1j applies directly to FIGS. 14i–14l with each track segment "50A" now being referred to as "64A".

Figure 14K:
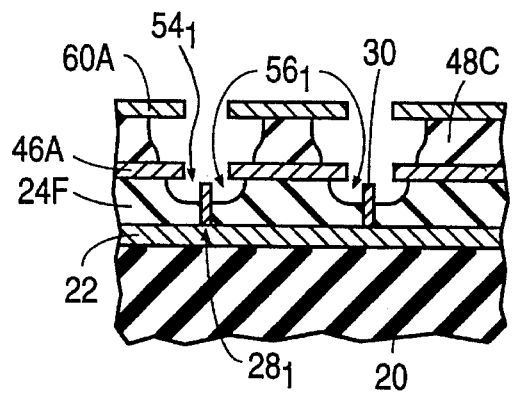
Figure 14I:
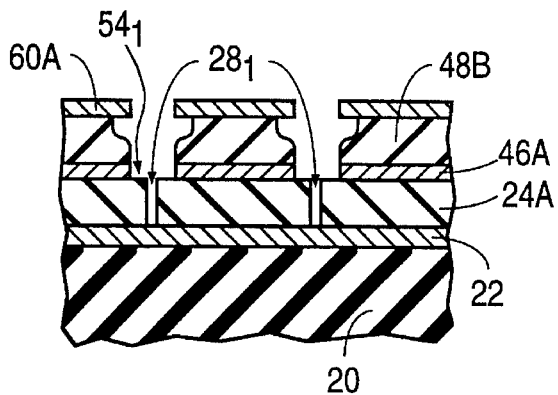

The exposed portions of insulating layer 48B below the edges of focusing electrode 60A are partially etched back. Depending on the properties of layers 48B and 24A, the etchback is either performed during the etch to create cavities 56 in porous insulating layer 24A or as a separate step. As indicated in FIG. 14k, the edges of layer 60A extend laterally beyond the remainder 48C of insulating layer 48B. Item 24F is again the remainder of porous layer 24A.

Figure 14L:
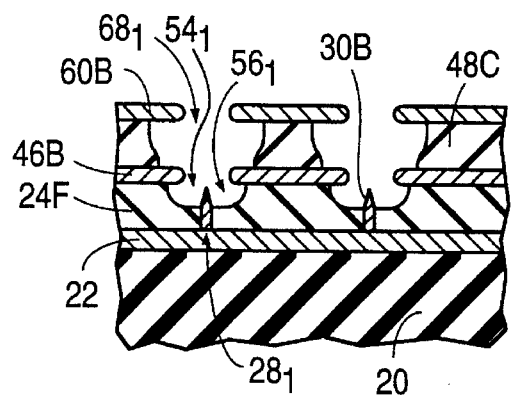

The edges of focusing layer 60A are typically rounded during the same electropolishing step used to round the edges of gate layer 46A. Item 60B in FIG. 14l is the rounded-edge patterned remainder of focusing layer 60A. Item 46B is again the rounded-edge patterned remainder of gate layer 46A. Likewise, items 30B are again the sharpened filaments. By virtue of the centering that arises from the track formation and etching, gate electrode 46B and focusing electrode 60B are both self-aligned to filaments 30B.

Lower conductive region 22 in FIG. 14l may again consist of highly resistive layer 22A and overlying highly conductive layer 22B as described above. Also, the steps employed to create focusing electrode 60B above insulating layer 48C can be repeated to create one or more further control electrodes above layer 60B. In doing so, the centering that results from the track formation and etching enables each further control electrode to be self-aligned to filaments 30B.

The process of FIG. 14 can be modified to produce a gated field emitter which has one or more control electrodes above the gate electrode and which also has electron-emissive elements of the type shown in FIG. 3e, 5e, 7h, 8h, or 9e. This modification is achieved in a manner similar to that used for modifying the process of FIG. 1 according to the steps shown in FIG. 3, 5, 7, 8, or 9.

FIGS. 15a–15d (collectively "FIG. 15") generally illustrate how the sequence of steps in FIG. 9 is applied to the process of FIG. 14 to create a gated field emitter having both a focusing electrode and conical electron-emissive elements. The starting point for the modification is FIG. 14g repeated here as FIG. 15a.

Figure 15A:
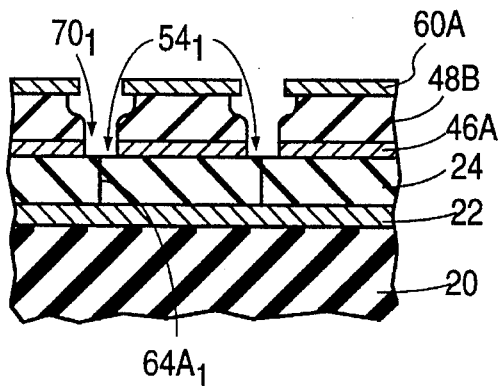
FIGS. 15a, 15b, 15c, and 15d are cross-sectional front structural views representing an alternative set of steps performable on the structure of FIG. 14g for manufacturing a gated field emitter that incorporates a focusing electrode according to the invention.
Figure 15B:
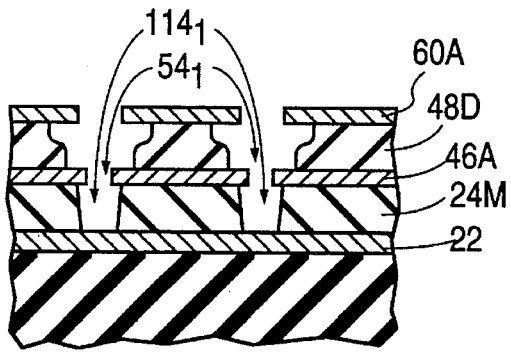

With portions of insulating layer 24 exposed through gate openings $54_1$, dielectric open spaces $114_1$ are etched through layer 24 down to lower conductive region 22 in the manner described above. FIG. 15b shows the resulting structure. Dielectric open spaces $114_2$ (not shown) are similarly formed through layer 24.

The exposed portions of insulating layer 48B below the edges of focusing electrode 60A are also etched back. Depending on the properties of layers 48B and 24, this etchback is either performed during the etch step to form dielectric open spaces 114 or as a separate step. If layers 48B and 24 are etched at the same time, the damaged insulating material along track segments $64A_1$ is normally attacked at a considerably faster rate than the undamaged material of insulating layer 24. This helps to reduce the etching of layer 48B and thereby avoid excessive further undercutting of focusing layer 60A. In any case, item 24M in FIG. 15*b* is again the remainder of layer 24. Item 48D is the remainder of layer 48B.

Figure 15C:
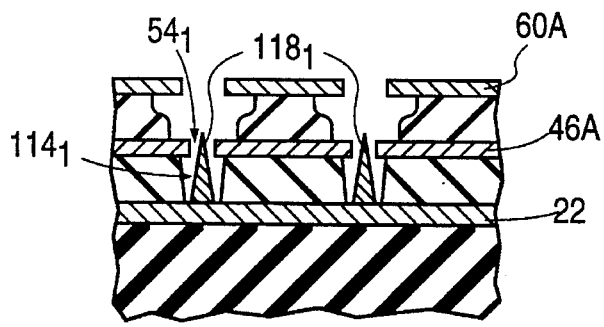

Conical electron-emissive elements 118$_1$ are then formed in dielectric open spaces 114$_1$ as indicated in FIG. 15*c*. Various techniques that take focusing electrode 60A into account can be used. For example, a lift-off layer can be created on focusing electrode 60A in the same way that lift-off layer 116 is created in the process of FIG. 9 except that the impingement angle is increased so that pieces of the lift-off material accumulate on portions of gate layer 46A exposed through gate openings 54$_1$. The remainder of the procedure for creating metal cones 118$_1$ is then performed as described above for the process of FIG. 9. During the removal of the lift-off layer and the overlying composite layer of the cone and closure materials, the pieces of the lift-off material on gate layer 46A are removed along with overlying composite pieces of the cone and closure materials.

Figure 15D:
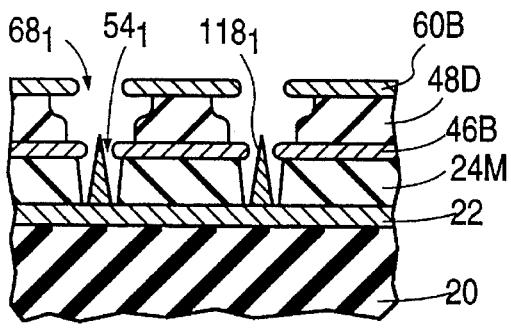

An electropolishing step is performed to round the edges of gate layer 46A in the manner described above. The edges of focusing electrode 60A are typically rounded at the same time. FIG. 15*d* shows the final structure. Items 46B and 60B are again the rounded-edge remainders of layers 46A and 60A. Due to the uniform nature of the deposition/lift-off technique employed to create cones 118$_1$, layers 46B and 60B are both self-aligned to cone 118$_1$.

FIGS. 16*a*–16*e* (collectively "FIG. 16") generally illustrate how the process of FIG. 14 is modified to produce a gated field emitter that has a focusing electrode and electron-emissive elements consisting of cones situated on pedestals. The starting point is the structure of FIG. 14*f* repeated here as FIG. 16*a*. The incidental structural facets created as a result of track segments 64A$_2$ (not shown here) are electrically inconsequential and, for simplicity, are not mentioned further.

Using insulating layer 48B as an etch mask, portions of gate layer 46 exposed through apertures 70$_1$ are removed with an isotropic etchant. The etching is continued uniformly into portions of layer 46 underlying layer 48B to create generally circular gate openings 120$_1$ down to portions of insulating layer 24 that overlie lower conductive region 22. See FIG. 16*b*. The etchant does not significantly attack focusing layer 60A or any of the other components of the structure except for layer 46.

Figure 16A:
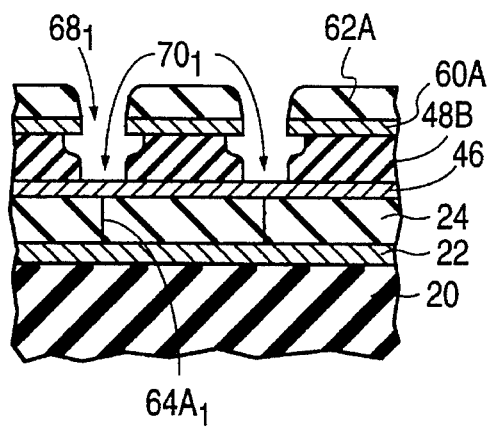
FIGS. 16a, 16b, 16c, 16d, and 16e are cross-sectional front structural views representing an alternative set of steps performable on the structure of FIG. 14f for manufacturing a gated field emitter that incorporates a focusing electrode according to the invention.
Figure 16B:
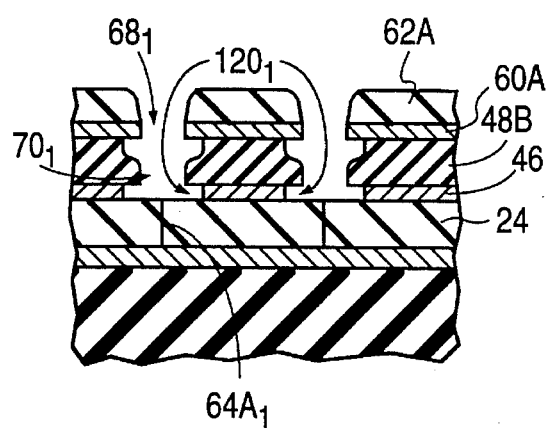

Each gate opening 120$_1$ has a greater diameter than overlying opening 68$_1$ in layer 60A. Also, each gate opening 120$_1$ is centered on the location of corresponding track segment 64B$_1$ (shown earlier in FIG. 14*e*). The remainder 46C of layer 46 in FIG. 16*b* is the patterned gate electrode for the field emitter.

Figure 16C:
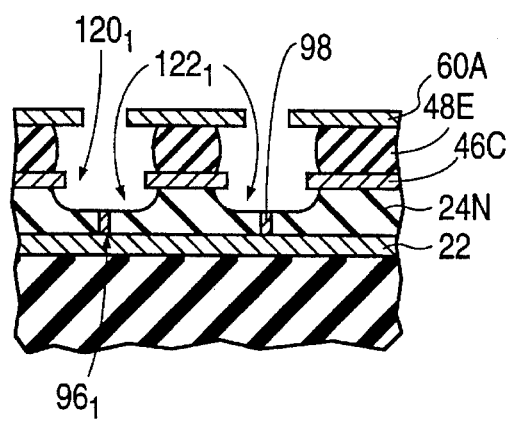

Insulating layer 62A is removed as indicated in FIG. 16*c*. Alternatively, layer 62A could be removed earlier in the process—e.g., as early as directly after the creation of openings 68$_1$ to define focusing layer 60A.

Portions of insulating layer 24 exposed through gate openings 120$_1$ are subsequently removed with an isotropic etchant to form cavities 122$_1$ that, like cavities 94$_1$ in FIG. 7*b*, extend partway through layer 24. Each cavity 122$_1$ extends slightly under gate electrode 46C. By using an etchant that attacks the damaged material along track segments 64A$_1$ at approximately the same rate as the undamaged insulating material of layer 24, the portion of each track segment 64A$_1$ at the bottom of corresponding cavity 122$_1$ is not significantly attacked during the etch.

The exposed portions of insulating layer 48B below the edges of focusing electrode 60A are also etched back. Depending on the properties of insulating layers 24 and 48B, this etch back can be done during the formation of cavities 122$_1$ or as a separate step. Item 48E in FIG. 16*c* is the remainder of layer 48B.

Pores 96$_1$ are created through insulating layer 24 along the remaining portions of track segments 64A$_1$ at the bottom of cavities 122$_1$ in the same way that pores 96$_1$ are created in the process of FIG. 7. Each gate opening 120$_1$ is thereby centered on corresponding pore 96$_1$. Item 24N in FIG. 16*c* is the remainder of layer 24.

Metal filaments 98 are formed in pores 96$_1$ in the same manner as in the process of FIG. 7. Due to the centering that results from the track formation and etching, filaments 98 are self aligned to gate openings 120$_1$ and therefore to gate electrode 46C.

Using the lift-off material deposition procedure described above for the process of FIG. 3 or 5, a lift-off layer 124 is formed on focusing electrode 60A. See FIG. 16*d*. None of the lift-off material accumulates on the tops of filaments 98. Likewise, none of the lift-off material normally accumulates on gate electrode 46C.

Figure 16D:
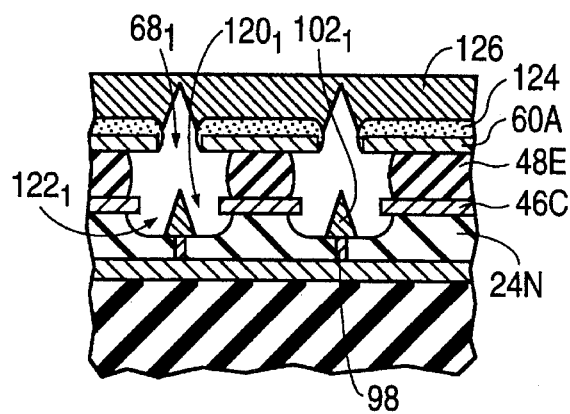

Conical tips 102$_1$ are formed on filaments 98 according to a double-source physical deposition as in the process of FIG. 7. A composite layer 126 of the tip and closure materials forms on lift-off layer 124 as shown in FIG. 16*d*. Because each gate opening 120$_1$ has a greater diameter than overlying opening 68$_1$ in focusing electrode 60A, substantially none of the tip or closure material accumulates on gate electrode 46C during the deposition. Each filament 98 and overlying cone 102$_1$ again form a composite longitudinally symmetric electron-emissive element. Each cavity 122$_1$ and underlying pore 96$_1$ constitute a dielectric open space for composite element 98/102$_1$.

Figure 16E:
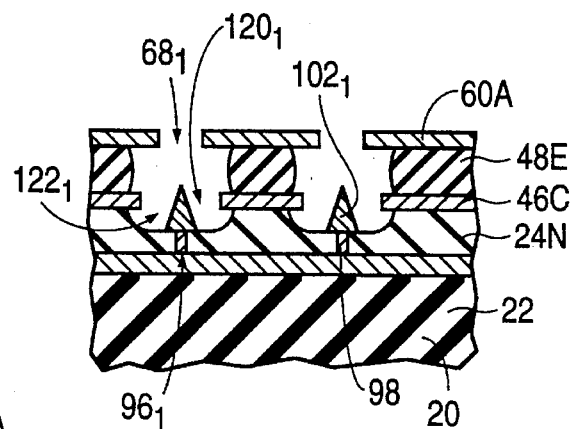

Lift-off layer 124 and composite layer 126 are removed according to conventional technique to produce the structure shown in FIG. 16*e*. The fabrication of the field emitter is normally completed by performing an electropolishing step to round the edges of electrodes 46C and 60A.

Unlike the process of FIG. 14 or 15 where the size (i.e., diameters) of apertures 70$_1$ through insulating layer 48B controls the size of gate openings 54$_1$, the size of gate openings 120$_1$ in the process of FIG. 16 is not determined by the size of apertures 70$_1$. Accordingly, the size of aperture 70$_1$ can be decreased in the process of FIG. 16 to reduce the undercutting of focusing electrode 60A.

In certain applications, it is desirable that each electron-emissive element contain a highly resistive, but still conductive, portion for improving emission uniformity and limiting emitter currents to prevent short-circuit and arcing failures. The highly resistive portion, preferably contacts lower conductive metal region 22. The resistance for the highly resistive portion is normally at least $10^6$ ohms, preferably $10^8$ ohms or more. More specifically, the resistance for the highly resistive portion is at least $10^{10}$ ohms. The highly resistive portions typically consist of cermet, doped polycrystalline silicon, or doped silicon carbide.

FIG. 17.1 illustrates how each electron-emissive filament 30B in FIG. 1*i* or 14*l* consists of a lower highly resistive portion 30C and an upper highly conductive electron-emissive pointed tip 30D. FIG. 17.2 illustrates how each electron-emissive cone 118$_1$ in FIG. 9*e* or 15*d* consists of a lower highly resistive portion 118A$_1$ and an upper highly conductive electron-emissive portion $118B_1$. To provide the electron-emissive elements with highly resistive portions $30C$ or $118A_1$, an initial part of the emitter deposition is performed with a highly resistive material rather than the metal(s) specified above. For filaments 30 in FIG. 3 or 5, either all or a lower part of each filament 30 is formed with highly resistive material. The same applies to filaments 98 in FIG. 7h or 16e and to filaments 110 in FIG. 8h.

The electron-emissive cones in the field emitters of the invention have, for simplicity, been illustrated in the drawings as being of right circular shape (i.e., a right triangle rotated about one of its legs). However, the cones invariably have surfaces that differ somewhat from a right circular shape. For example, the surfaces of the cones typically bend inward slightly as shown in FIG. 18.1 for cones $102_1$ of FIG. 7h or 16e and as depicted in FIG. 18.2 for cones $118_1$ of FIG. 9e or 15d.

FIGS. 19.1–19.4 illustrate several longitudinal shapes that filaments 30B can have in the final field emitters of FIG. 1j and 14l. As indicated in FIGS. 19.1 and 19.2, filaments 30B can be solid cylinders except at their upper ends. If tracks 50 are etched in such a manner as to create pores 28 as inverted cones, filaments 30B can be inverted solid cones which taper down in transverse cross section from just below their upper ends to their lower ends in the manner shown in FIGS. 19.3 and 19.4. Depending on how the electropolishing and etching operation is done, the electron-emissive tips at the upper ends of filaments 30B can be generally rounded as indicated in FIGS. 19.1 and 19.3 or sharply pointed as indicated in FIGS. 19.2 and 19.4.

FIG. 20 depicts the electrochemical deposition system employed during the electrochemical filament deposition operations described above. The electrochemical system consists of an electrochemical cell 72 and a power supply and control system 74. In turn, electrochemical cell 72 consists of cell electrolyte 76, a surrounding sidewall 78, an O-ring 80, an anode 82, and a cathode 84 formed by part of the structure on which metal is being deposited. Cathode 84 includes lower conductive region 22 to which power supply and control system 74 is connected. FIG. 20 specifically illustrates the filament deposition in the process of FIGS. 1 and 2.

The electrochemical system shown in FIG. 20 operates according to a constant-current technique. Alternatively, a constant-voltage electrochemical deposition system could be used.

The field emitters of the present invention operate in the following way. An anode (or collector) structure is situated a short distance away from the top of each field emitter. A voltage is applied between the anode and a selected one of the lines that forms lower conductive region 22. The particular electron-emissive elements above the selected line then emit electrons collected at the anode structure. The gate electrode extracts electrons from the filaments and controls the magnitude of the electron beam. The focusing electrode, when present, focuses the electron beam.

Directional terms such as "lower" and "down" have been employed in describing the present invention to establish a frame of reference by which the reader can more easily understand how the various parts of the invention fit together. In actual practice, the components of a field emitter may be situated at orientations different from that implied by the directional terms used here. The same applies to the way in which the fabrication steps are performed in the invention. Inasmuch as directional terms are used for convenience to facilitate the description, the invention encompasses implementations in which the orientations differ from those strictly covered by the directional terms employed here.

The various electron-emissive elements and charged-particle tracks (or track segments) have longitudinal axes (not shown). Each electron-emissive element is generally symmetric about its longitudinal axis. A reference to an etch as being performed along a charged-particle track through an insulating layer means that the removed material occupied a volume containing at least part of the track's longitudinal axis in the insulating layer.

While the invention has been described with reference to particular embodiments, this description is solely for the purpose of illustration and is not to be construed as limiting the scope of the invention claimed below. For example, substrate 20 could be deleted if lower conductive region 22 is a continuous layer of sufficient thickness to support the structure. Insulating substrate 20 could be replaced with a composite substrate in which a thin insulating layer overlies a relatively thick non-insulating layer that furnishes the necessary structural support. Substrate 20 and/or conductive region 22 could be formed under insulating layer 24 after charged-particle tracks 50 are formed through it. Gate layer 46 could be patterned into lines running perpendicular to the lines that form region 22.

The electrochemical depositions could be performed by a full immersion technique with the sides of the field emitter suitably protected to avoid unwanted deposition. Thermal annealing could be used to modify the filament shape. Various modifications and applications may thus be made by those skilled in the art without departing from the true scope and spirit of the invention as defined in the appended claims.

We claim:

1. An electron-emitting structure comprising:

a lower electrically conductive region; and a multiplicity of laterally separated electron-emissive elements contacting the lower conductive region, each electron-emissive element comprising (a) a highly resistive portion situated over the lower conductive region and (b) a corresponding electron-emissive portion situated over the highly resistive portion, the electron-emissive portion comprising material generally in the shape of a cone pointing away from the lower conductive region, the diameter of the cone at its base being greater than the maximum diameter of the underlying highly resistive portion.

2. A structure as in claim 1 further including:

an electrically insulating layer lying over the lower conductive region, a like multiplicity of dielectric open spaces extending fully through the insulating layer, at least part of each electron-emissive element situated in a corresponding one of the dielectric open spaces; and a patterned electrically conductive gate layer lying over the insulating layer, a like multiplicity of gate openings extending fully through the gate layer, each electron-emissive element being exposed through a corresponding one of the gate openings.

3. A structure as in claim 1 wherein the electron-emissive elements longitudinally extend generally perpendicular to the lower conductive region along its upper surface.

4. A structure as in claim 1 wherein the electron-emissive elements are situated at locations substantially random relative to one another.

5. A structure as in claim 1 wherein the electron-emissive portion of each electron-emissive element comprises a generally pointed tip pointing away from the lower conductive region.

6. A structure as in claim 1 wherein the lower conductive region comprises metal.

7. A structure as in claim 1 wherein each electron-emissive element is generally in the shape of a cone pointing away from the lower conductive region.

8. A structure as in claim 1 wherein each highly resistive portion has a resistance of at least $10^6$ ohms.

9. A structure as in claim 1 wherein the highly resistive portions comprise at least one of (a) cermet and (b) polycrystalline silicon.

10. A structure as in claim 1 wherein the electron-emissive elements operate in field-emission mode.

11. An electron-emitting structure comprising:

a lower electrically conductive region; and a multiplicity of elongated laterally separated electron-emissive elements having respective lower ends that contact the lower conductive region, each electron-emissive element reaching a maximum diameter at a point between, and spaced apart from, both ends of that electron-emissive element.

12. A structure as in claim 11 wherein each electron-emissive element is generally symmetrical about its longitudinal axis.

13. A structure as in claim 11 wherein the electron-emissive elements longitudinally extend generally perpendicular to the lower conductive region along its upper surface.

14. A structure as in claim 11 wherein the electron-emissive elements are situated at locations substantially random relative to one another.

15. A structure as in claim 11 further including:

an electrically insulating layer lying over the lower conductive region, a like multiplicity of dielectric open spaces extending fully through the insulating layer, at least part of each electron-emissive element situated in a corresponding one of the dielectric open spaces; and a patterned electrically conductive gate layer lying over the insulating layer, a like multiplicity of gate openings extending fully through the gate layer, each electron-emissive element being exposed through a corresponding one of the gate openings.

16. A structure as in claim 11 wherein the electron-emissive elements operate in field-emission mode.

17. An electron-emitting structure comprising:

a lower electrically conductive region; and a multiplicity of laterally separated electron-emissive elements, each comprising (a) an electrically conductive pedestal situated over the lower conductive region and (b) an electron-emissive portion situated over the pedestal, the electron-emissive portion being generally in the shape of a cone that points away from the lower conductive region, the diameter of the cone at its base being greater than the maximum diameter of the pedestal.

18. A structure as in claim 17 wherein each cone is generally centered on its pedestal.

19. A structure as in claim 17 further including:

an electrically insulating layer lying over the lower conductive region, a like multiplicity of dielectric open spaces extending fully through the insulating layer, at least part of each electron-emissive element being situated in a corresponding one of the dielectric open spaces; and a patterned electrically conductive gate layer lying over the insulating layer, a like multiplicity of gate openings extending fully through the gate layer, each cone being exposed through a corresponding one of the gate openings.

20. A structure as in claim 19 wherein each gate opening is generally centered on its electron-emissive element.

21. A structure as in claim 19 wherein each pedestal laterally adjoins the insulating layer.

22. A structure as in claim 17 wherein the pedestals extend generally perpendicular to the lower conductive region along its upper surface.

23. A structure as in claim 17 wherein the electron-emissive elements are situated at locations substantially random relative to one another.

24. A structure as in claim 17 wherein the electron-emissive elements operate in field-emission mode.

25. An electron-emitting structure comprising:

a lower electrically conductive region which comprises (a) a highly conductive part and (b) a highly resistive part situated over the highly conductive part; and a multiplicity of laterally separated electron-emissive elements situated on the highly resistive part above the highly conductive part, each electron-emissive element comprising (a) an electrically conductive pedestal situated over the highly resistive part and (b) an electron-emissive portion situated over the pedestal, the electron-emissive portion being generally in the shape of a cone that points away from the highly resistive part, the diameter of the cone at its base being greater than the maximum diameter of the pedestal.

26. A structure as in claim 25 further including:

an electrically insulating layer lying over the highly resistive part, a like multiplicity of dielectric open spaces extending fully through the insulating layer, at least part of each electron-emissive element situated in a corresponding one of the dielectric open spaces; and a patterned electrically conductive gate layer lying over the insulating layer, a like multiplicity of gate openings extending through the gate layer, each electron-emissive element being exposed through a corresponding one of the gate openings.

27. A structure as in claim 25 wherein each cone is generally centered on its pedestal.

28. A structure as in claim 25 wherein the electron-emissive elements longitudinally extend generally perpendicular to the lower conductive region along its upper surface.

29. A structure as in claim 25 wherein the electron-emissive elements are situated at locations substantially random relative to one another.

30. A structure as in claim 25 wherein the highly resistive part has a resistance of at least $10^6$ ohms between each pedestal and the highly conductive part.

31. A structure as in claim 25 wherein the highly resistive part comprises at least one of (a) cermet and (b) polycrystalline silicon.

32. A structure as in claim 25 wherein the electron-emissive elements operate in field-emission mode.

* * * * *